Figure 3:
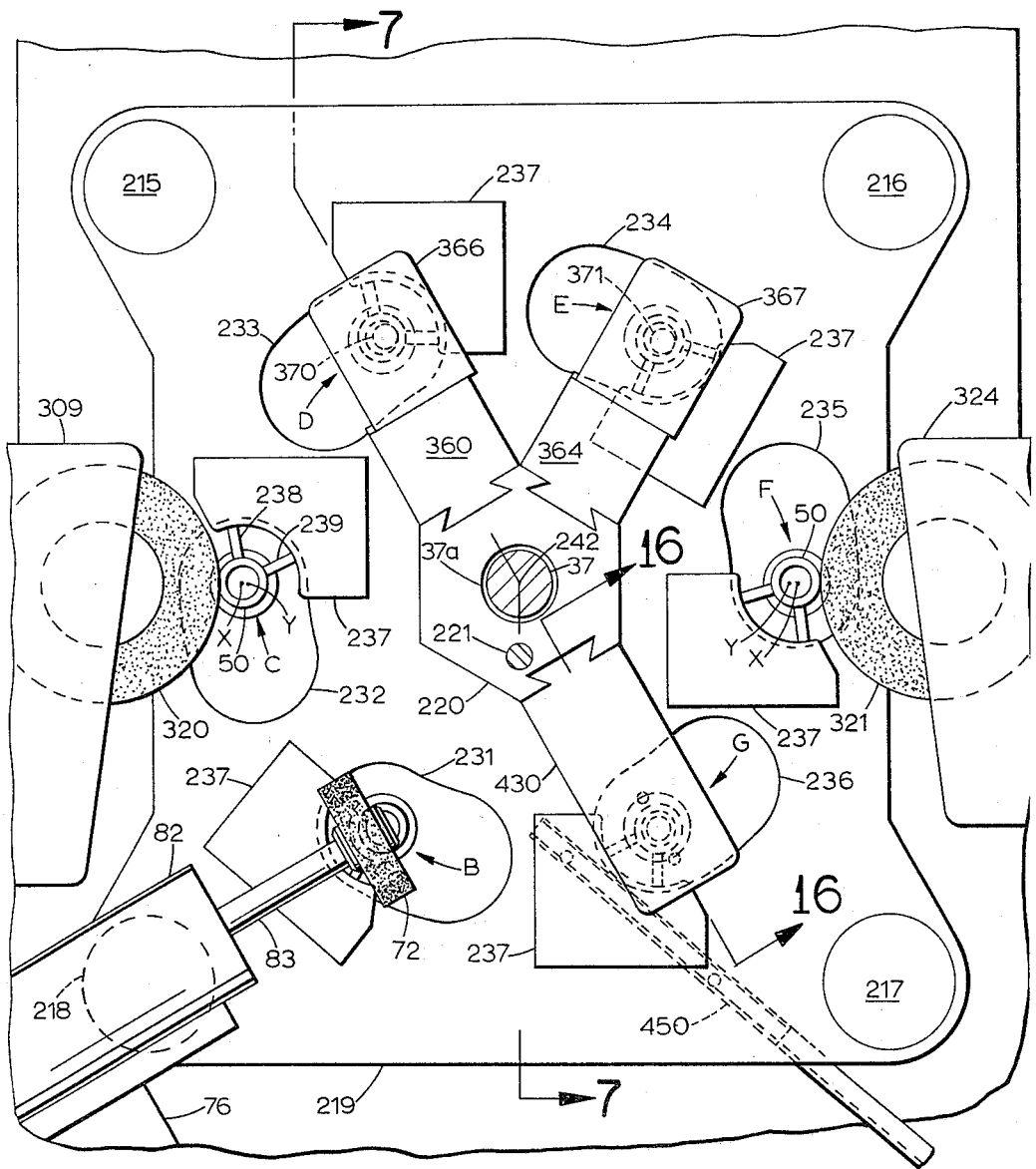

Nov. 15, 1966  W. B. SEIDEL  3,284,959
MULTI-STATION GRINDING MACHINE
Filed May 25, 1964  13 Sheets-Sheet 1
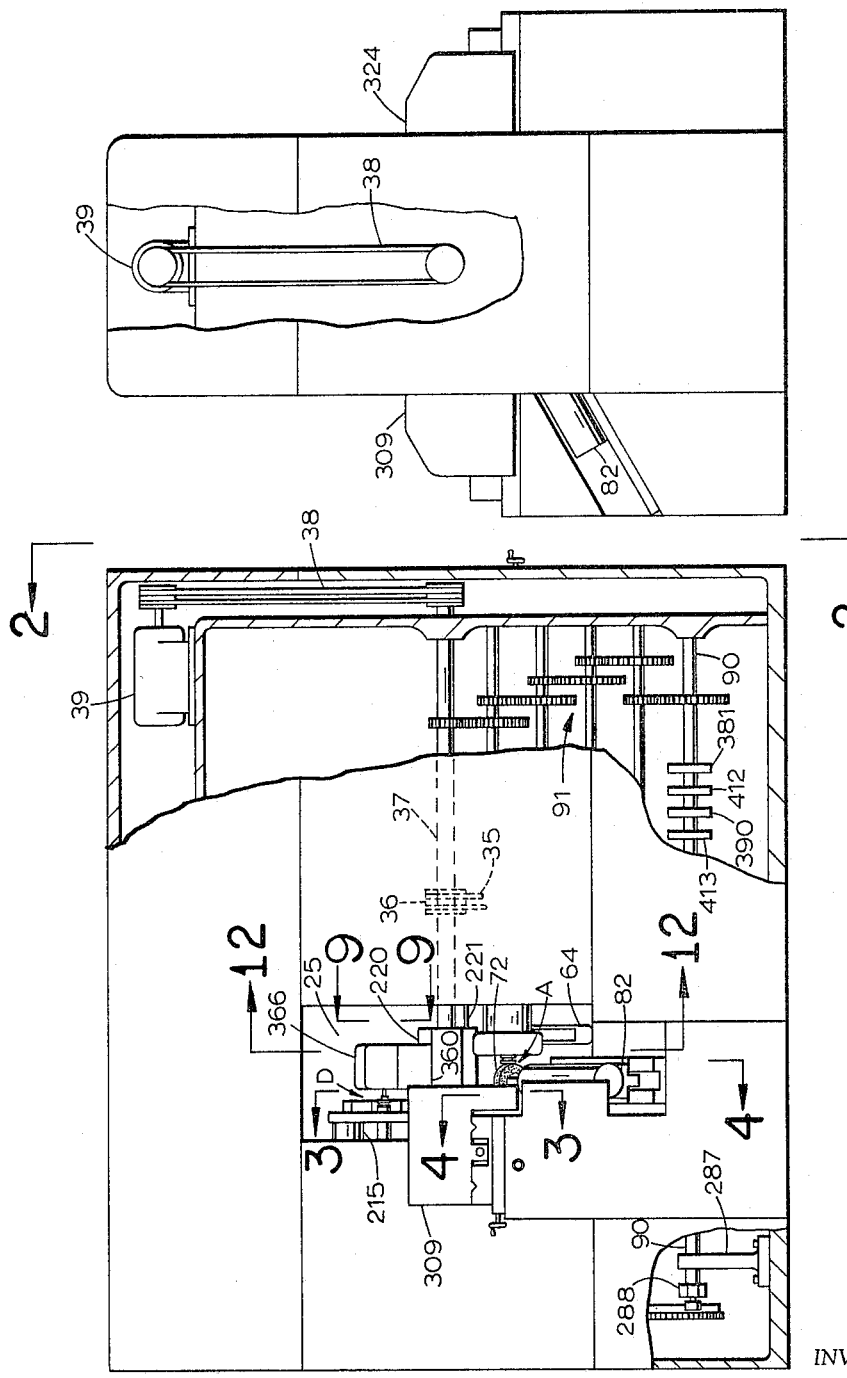
INVENTOR.
WILLIAM B. SEIDEL
BY
Howard A. Keiser
John F. Verhoeven
ATTORNEYS Nov. 15, 1966 W. B. SEIDEL 3,284,959
MULTI-STATION GRINDING MACHINE
Filed May 25, 1964 13 Sheets-Sheet 2

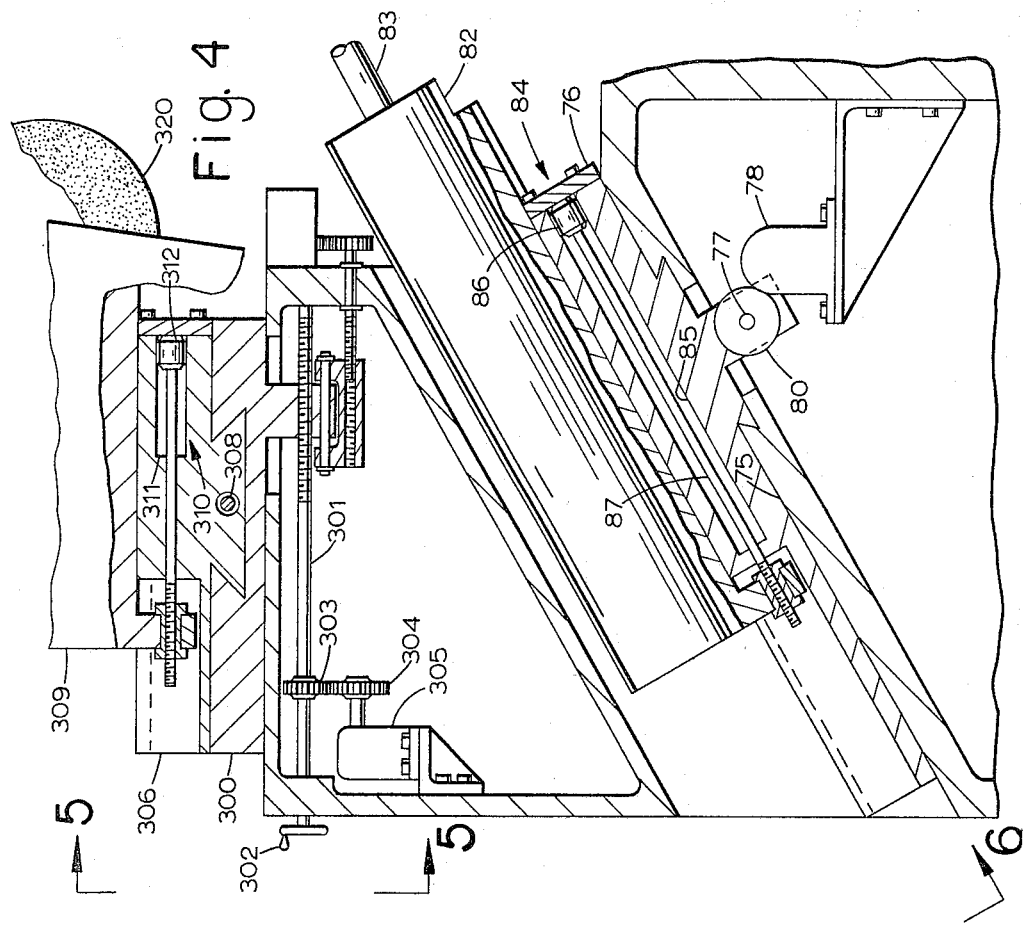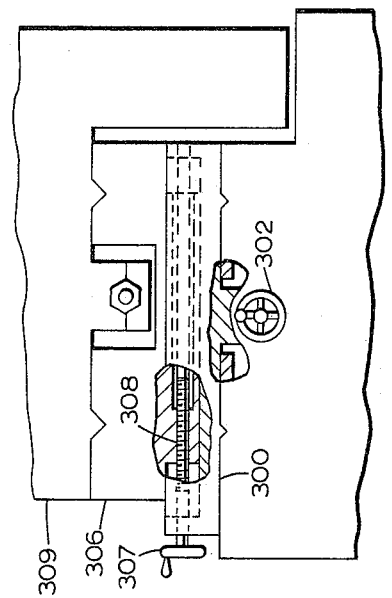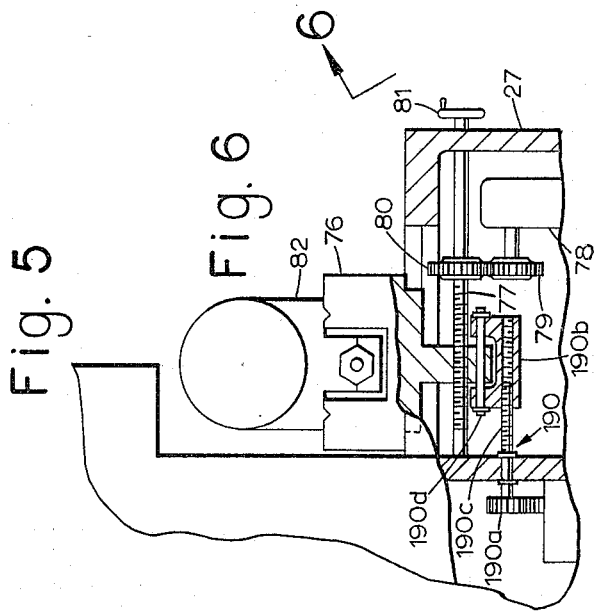

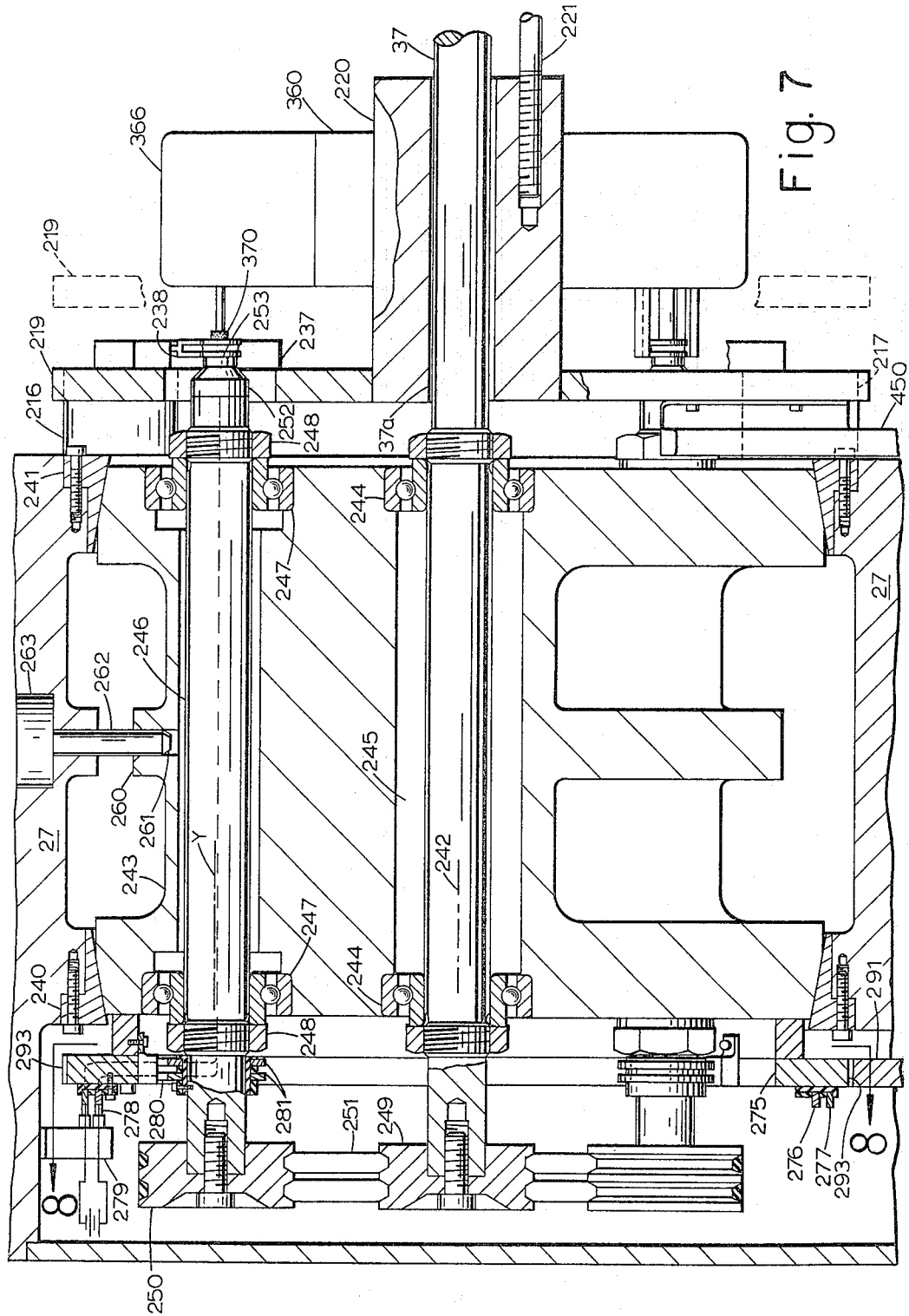

Nov. 15, 1966   W. B. SEIDEL   3,284,959
MULTI-STATION GRINDING MACHINE
Filed May 25, 1964   13 Sheets-Sheet 5

Nov. 15, 1966   W. B. SEIDEL   3,284,959
MULTI-STATION GRINDING MACHINE
Filed May 25, 1964   13 Sheets-Sheet 6
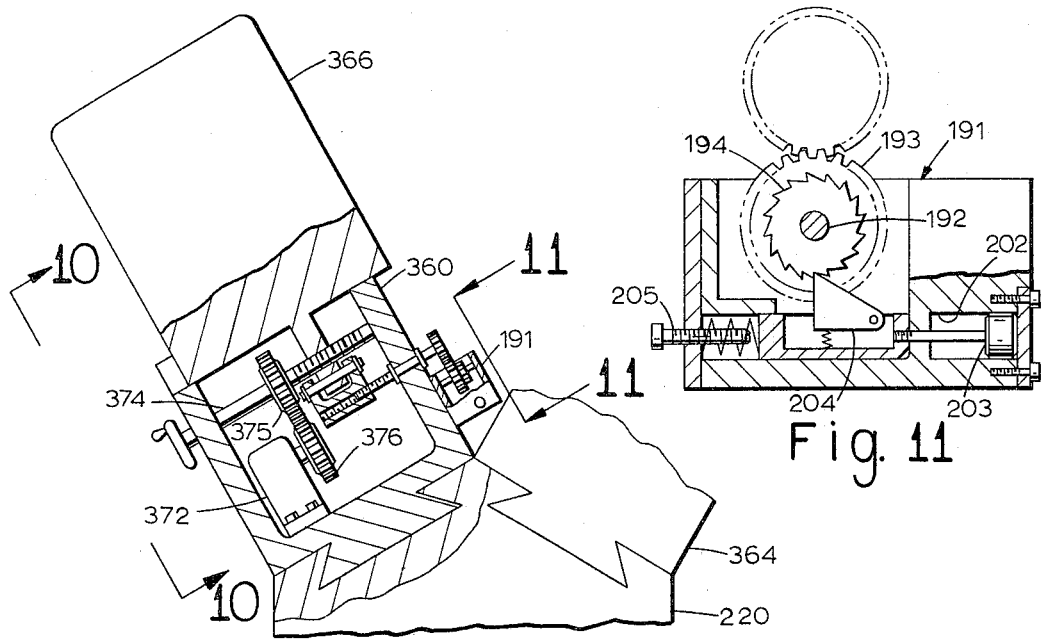
Fig. 9
Fig. 11
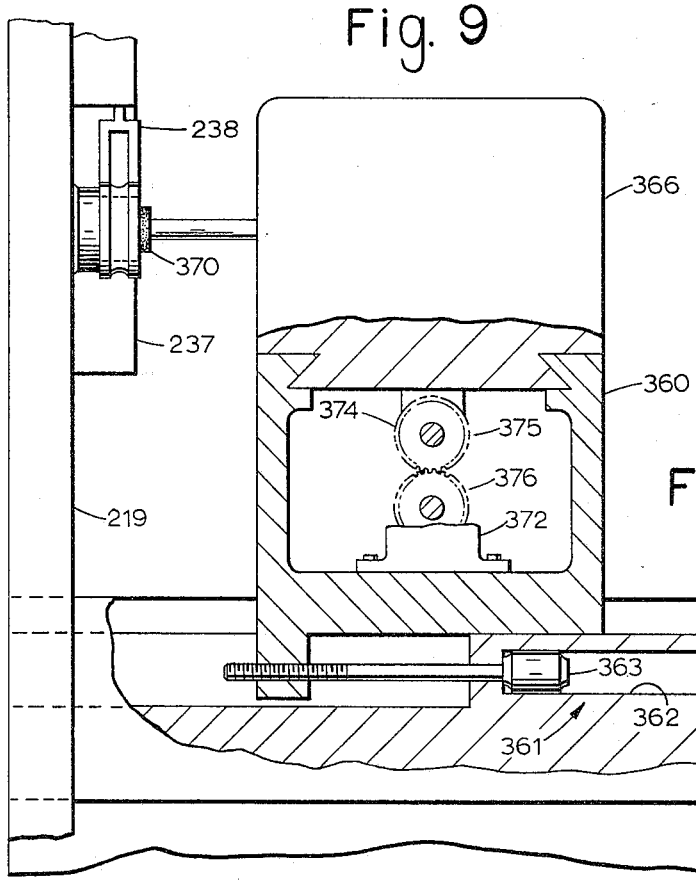
Fig. 10

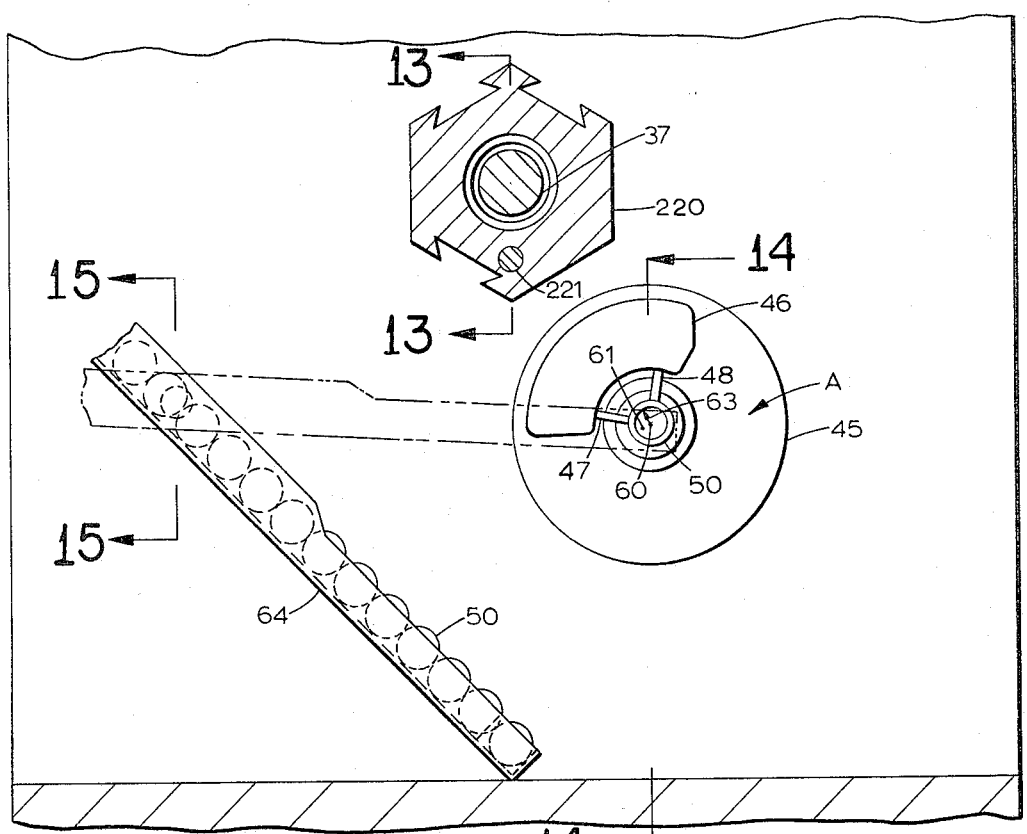
Fig. 12
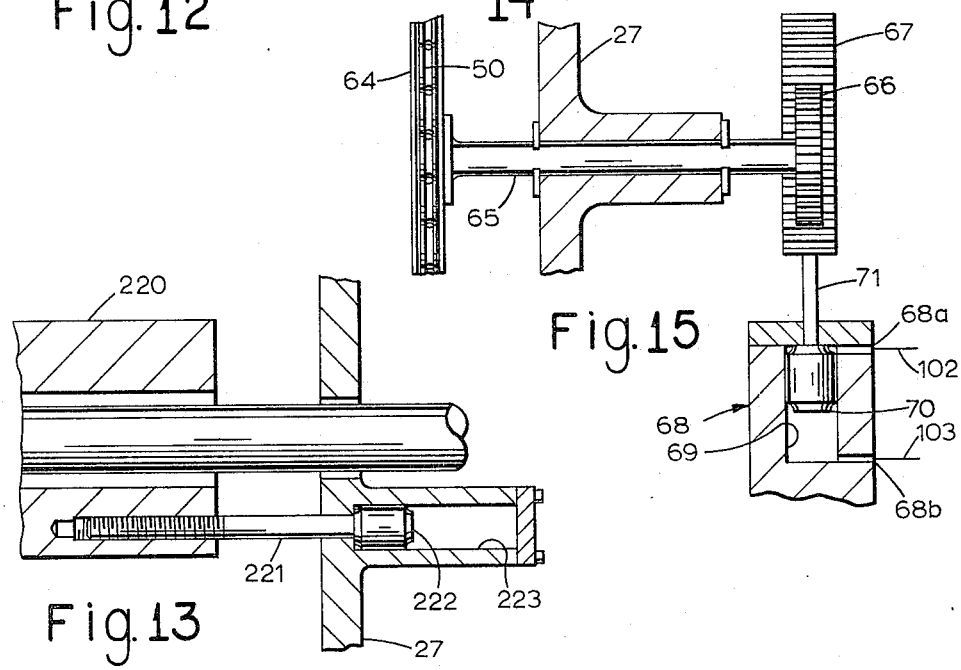
Fig. 15
Fig. 13

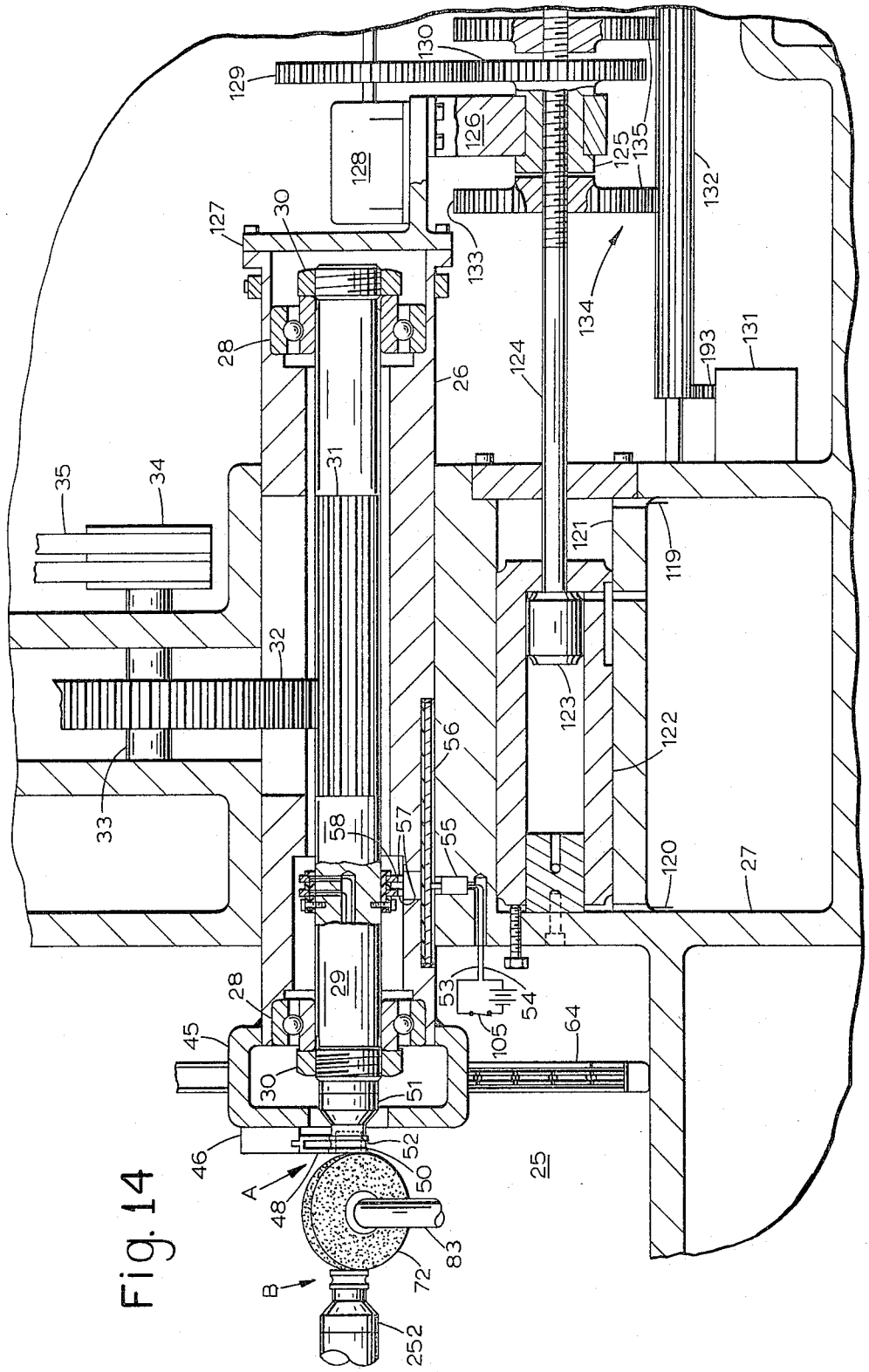

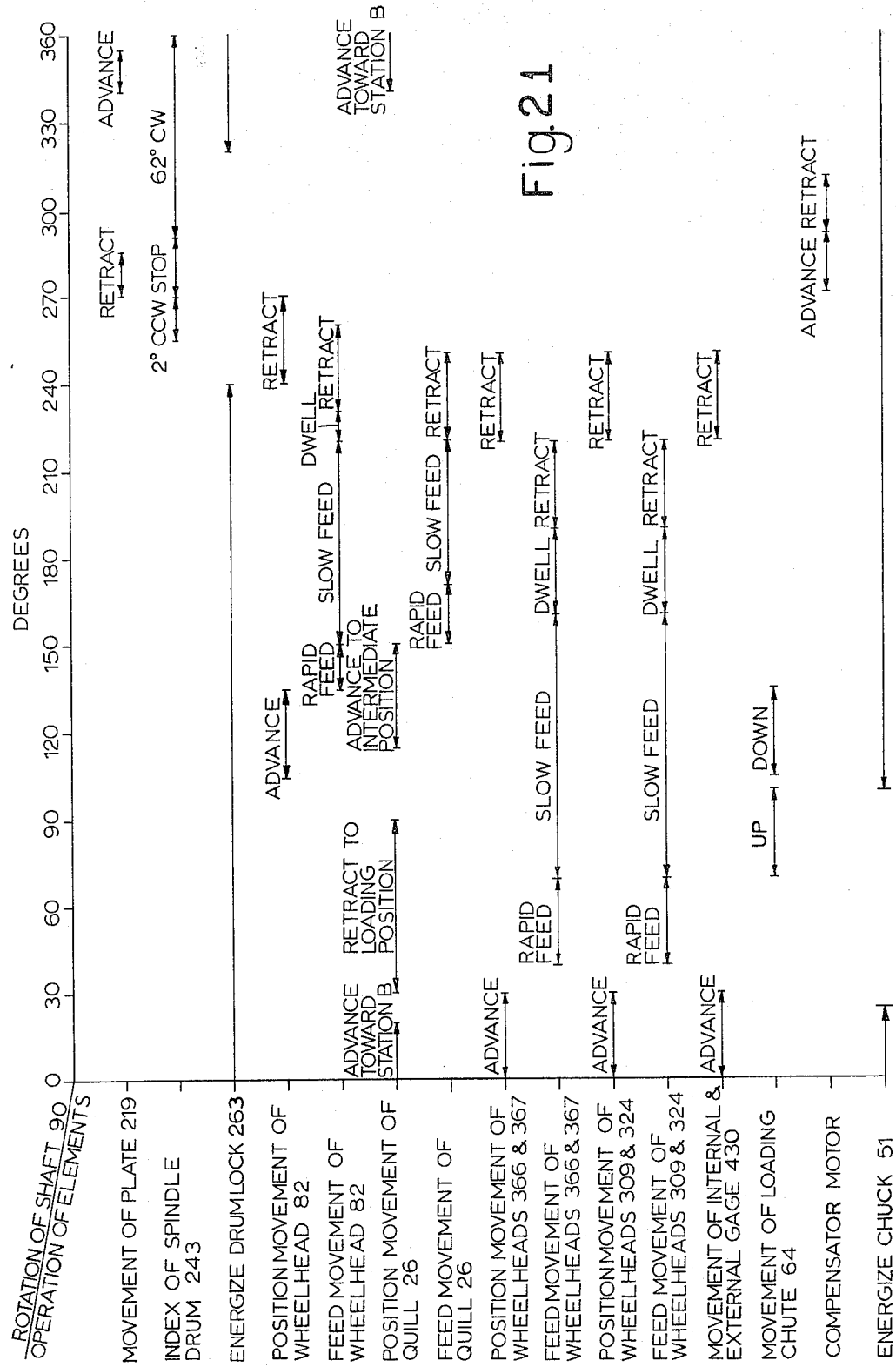

United States Patent Office 3,284,959
Patented Nov. 15, 1966

3,284,959
MULTI-STATION GRINDING MACHINE
William B. Seidel, Cincinnati, Ohio, assignor to The Cincinnati Milling Machine Co., Cincinnati, Ohio, a corporation of Ohio
Filed May 25, 1964, Ser. No. 369,835
20 Claims. (Cl. 51—108)

The present invention relates to a grinding machine and, more particularly, to a multi-station grinding machine of the type in which a workpiece is urged into a support for location at each operating station.

In one type of grinding opertion, particularly suitable for grinding an annular workpiece such as a bearing race, the workpiece is held against a flat drive face, either magnetically or by a pressure member. The workpiece is held with sufficient force against the drive face so that the drive face imparts rotation to the workpiece, but the force is not great enough to prevent radial movement of the workpiece on the face plate. The workpiece is mounted on the drive face in eccentric relation to the axis of rotation of the drive face and adjacent a fixed support. By virtue of the eccentricity of the workpiece on the rotating drive face, the workpiece is urged into the fixed support which may, for example, be a pair of angularly spaced shoes. Since the workpiece is not held tightly by the drive face, it can slide on the eccentrically related drive face as the drive face rotates the workpiece in the shoes. Grinding of this type is more fully described in U.S. Patent 2,478,607.

It is one object of the present invention to provide a machine capable of producing two or more successive grinds of this type on a workpiece.

In this type of grinding, where the workpiece is not gripped tightly by the member which rotates it, the workpiece support, or shoes, alone, locate the workpiece during grinding. The accuracy of the grind depends on the precision with which the workpiece is located during grinding (with respect to the grinding wheel, or, more specifically, with respect to the final, extreme feed position of the grinding wheel in the grind cycle). Any angular movement of support shoes from operating station to operating station makes precision location of the workpiece support shoes more difficult, and, therefore, in the preferred form of the present invention, the workpiece supports are not moved from one operating station to the next. It is another object of the present invention to provide a multi-station grinding machine in which the workpieces are moved from station to station but the supports which locate the workpieces for an operation thereon are not moved from station to station.

The conveyance of the workpieces, between grinds thereon, from station to station is accomplished, in the preferred form of the present invention, by the driving members which rotate the workpieces. These driving members are mounted in a drum which is periodically indexed to carry the workpieces magnetically gripped by the driving members from one operating station to the next. This is made possible, however, only because the workpiece supporting shoes and the drum are relatively shiftable so that clearance is provided for transport of the workpieces. It is therefore another object of the present invention to provide a multi-station grinding machine having a plurality of angularly fixed workpiece supports, and a rotatable drum to convey the workpieces between the supports, in which the supports and drum are relatively shiftable alternately to bring the supports into and out of the path of the workpieces conveyed by the drum.

In order to faciltate engagement and disengagement of workpieces carried by the drum with the angularly fixed shoes at the respective operating stations, the drum, during each index movement, is rotated in one direction and then the other. Initially, the drum rotates a small amount in one direction to lift the workpieces off the shoes. Then the shoes are shifted out of the path of the workpieces and rotation of the drum is reversed to move the workpieces toward the next operating station. During this transport movement the shoes are moved back into the path of the workpieces to receive the workpieces for grinding. It is therefore still another object of the present invention to provide a rotatable workpiece-conveying carrier which rotates in one direction and the other direction to facilitate loading and unloading of workpieces relative to workpiece supports. It is yet another object of the present invention to provide, in a multi-station grinding machine, workpiece supports which shift out of the path of the workpieces as conveyance of the workpiece toward the next operating station is initiated, and which shift back into the path of the workpieces as conveyance of the workpieces to the next operating station terminates.

Other subjects, such as providing mechanism for the transfer of workpieces between axially aligned operating stations, will be readily apparent by reference to the following specification, considered in conjunction with the accompanying drawings forming a part thereof, and it is to be understood that any modifications may be made in exact structural details there shown and described, within the scope of the appended claims, without departing from or exceeding the spirit of the invention.

Figure 16:
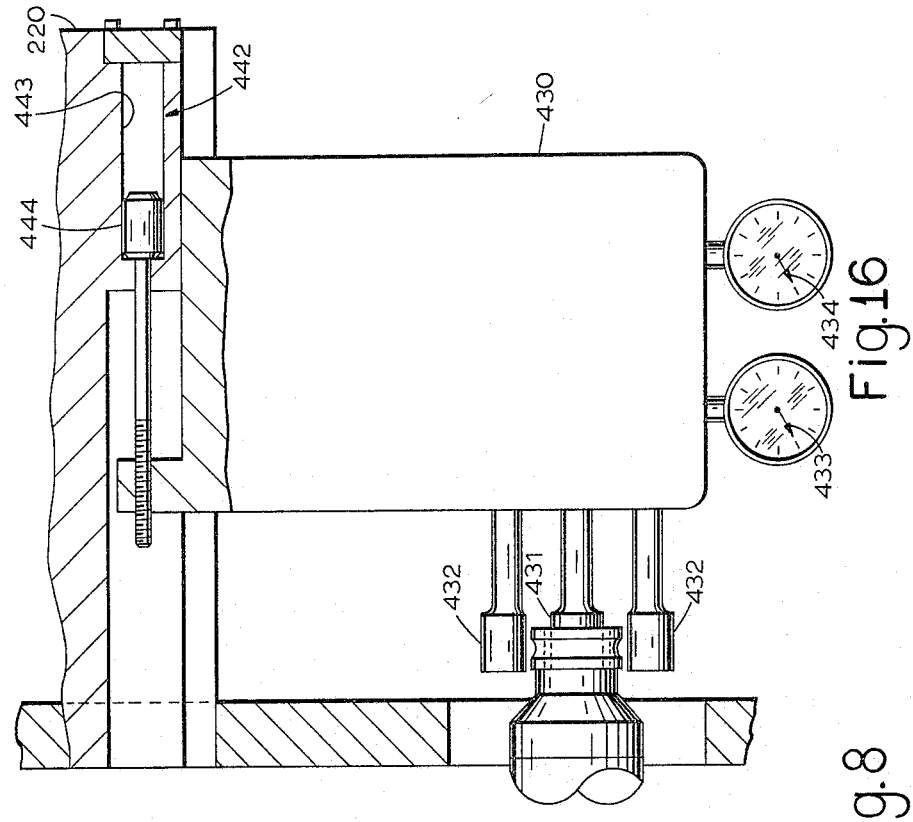
Figure 8:
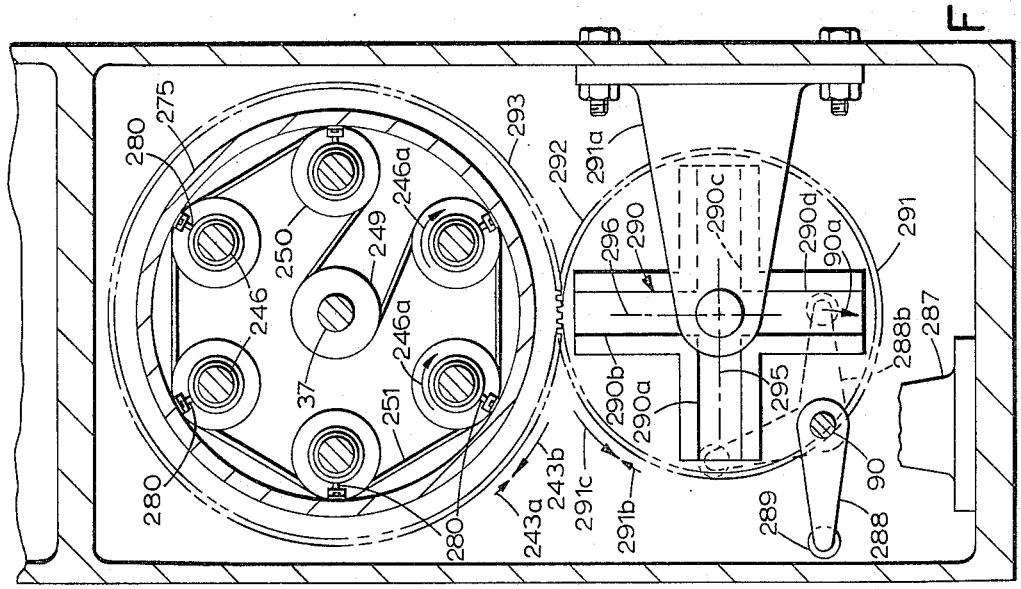
Figure 17:
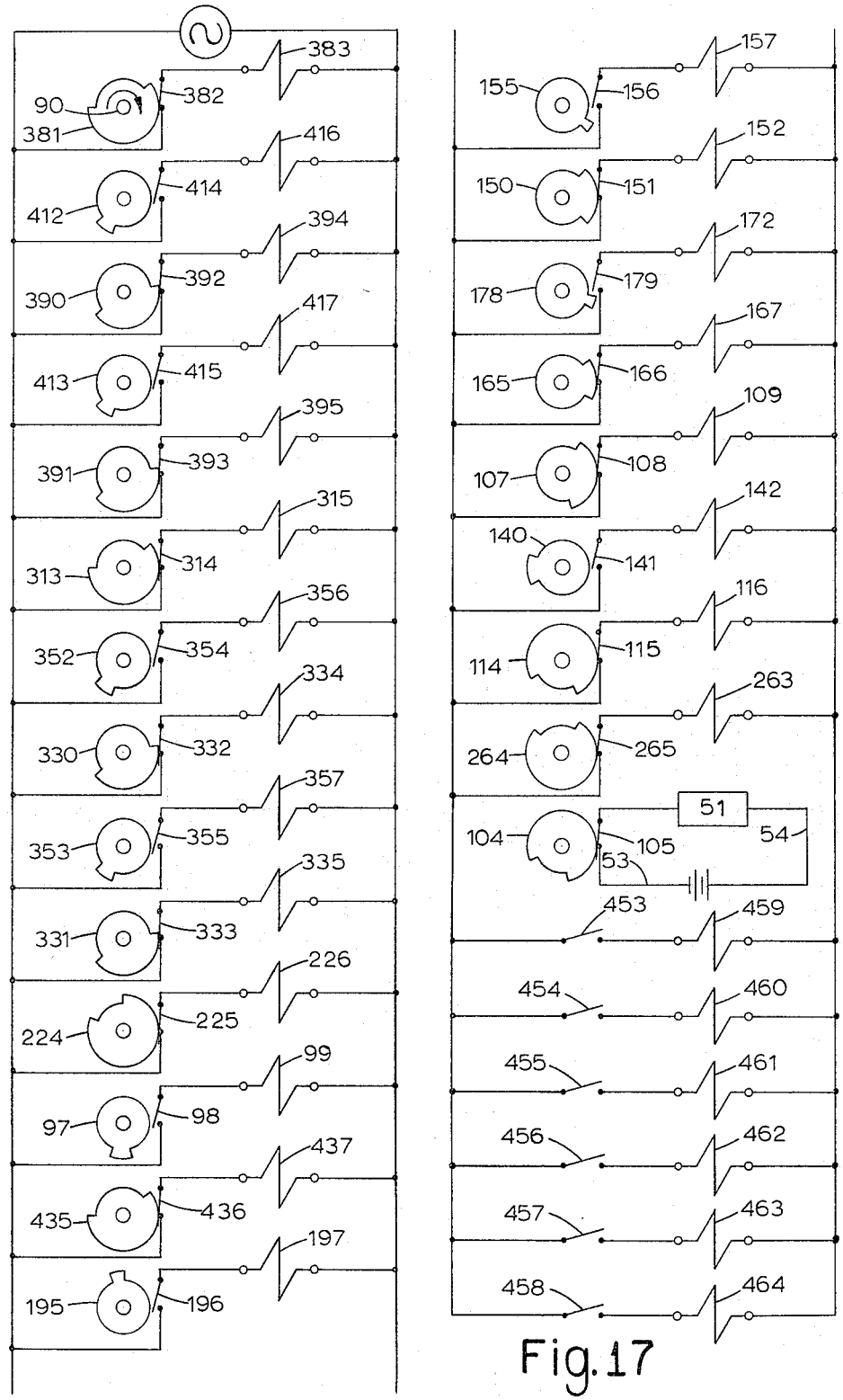
Figure 18:
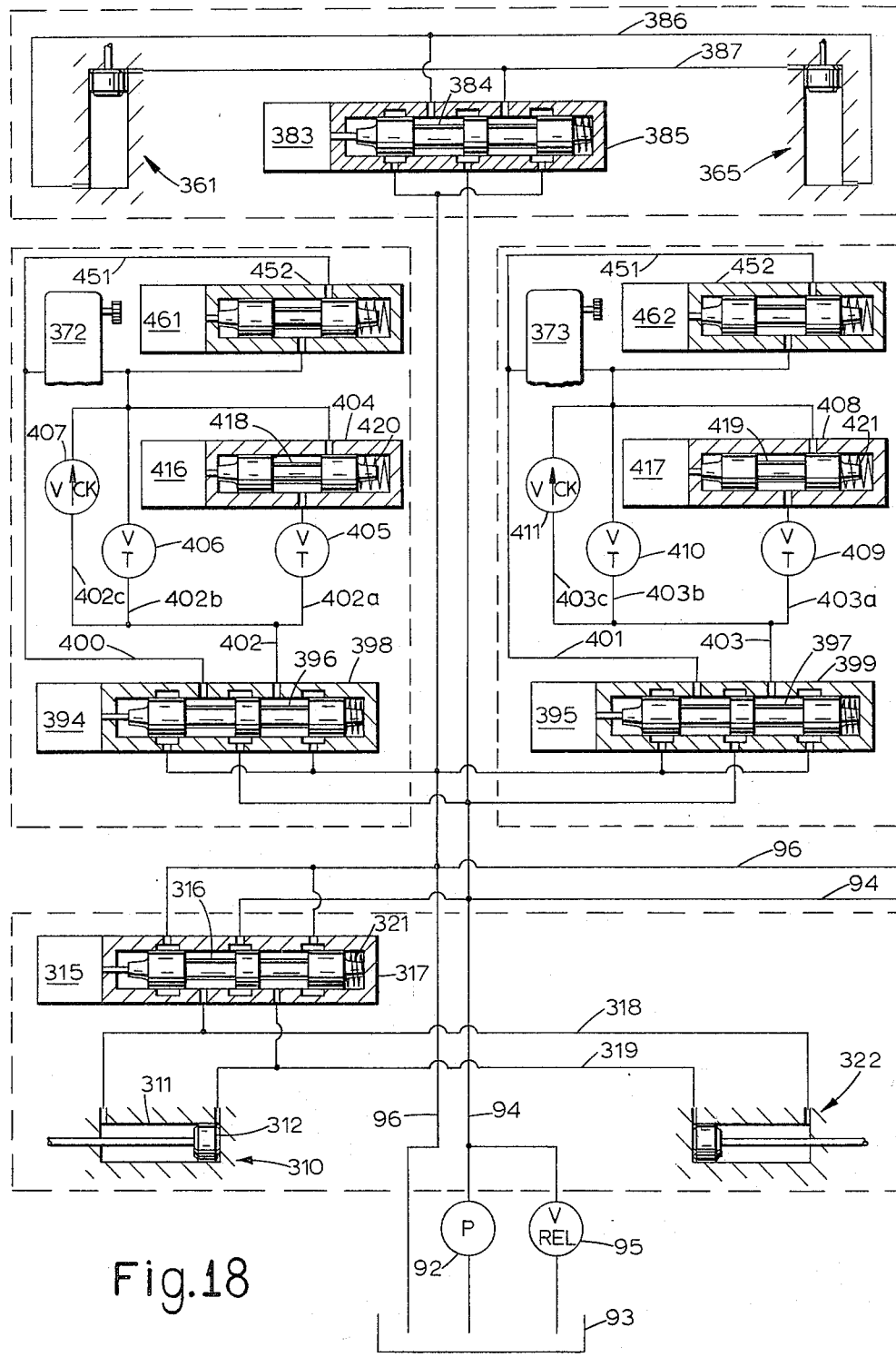
Figure 19:
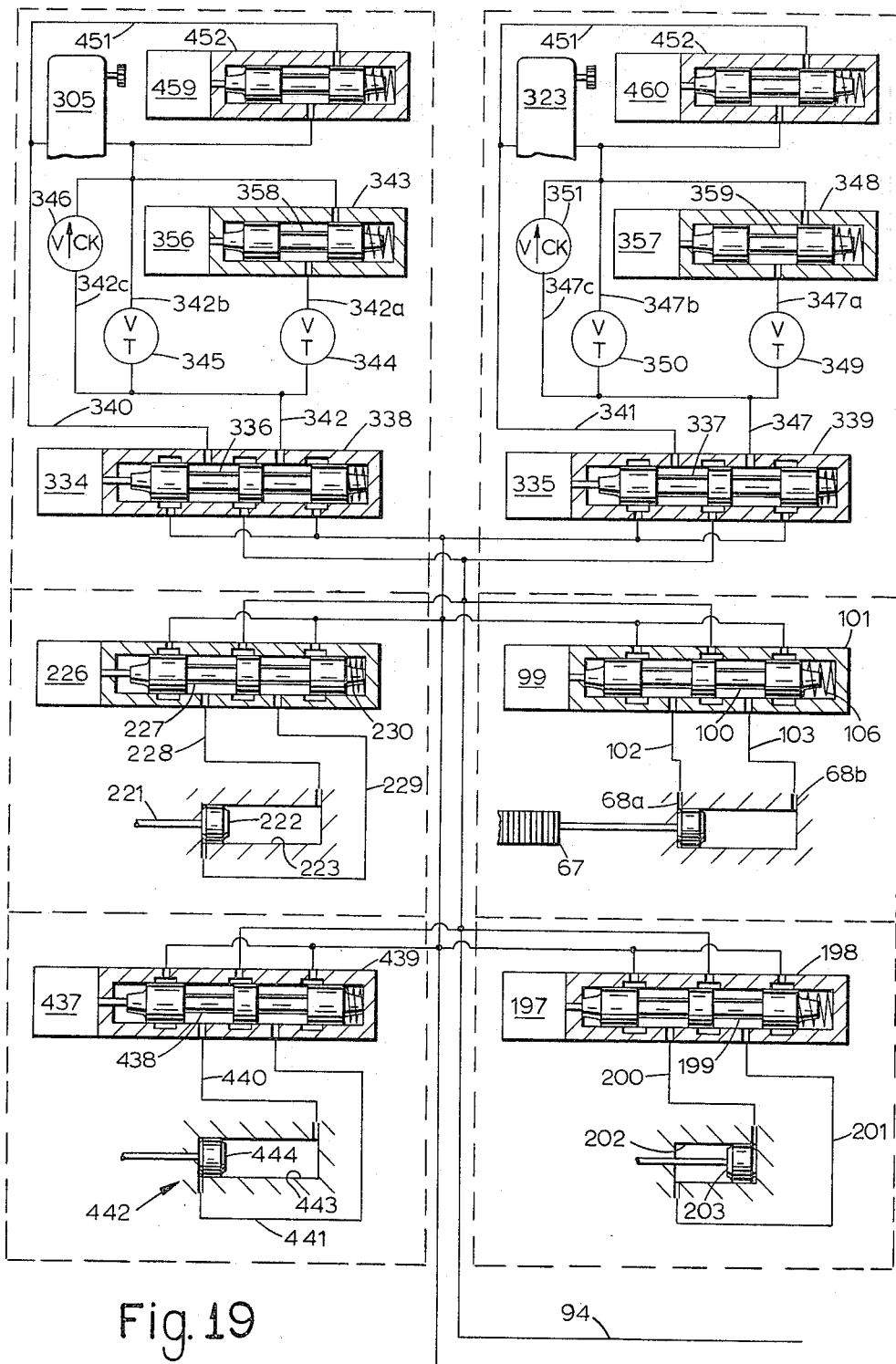
Figure 20:
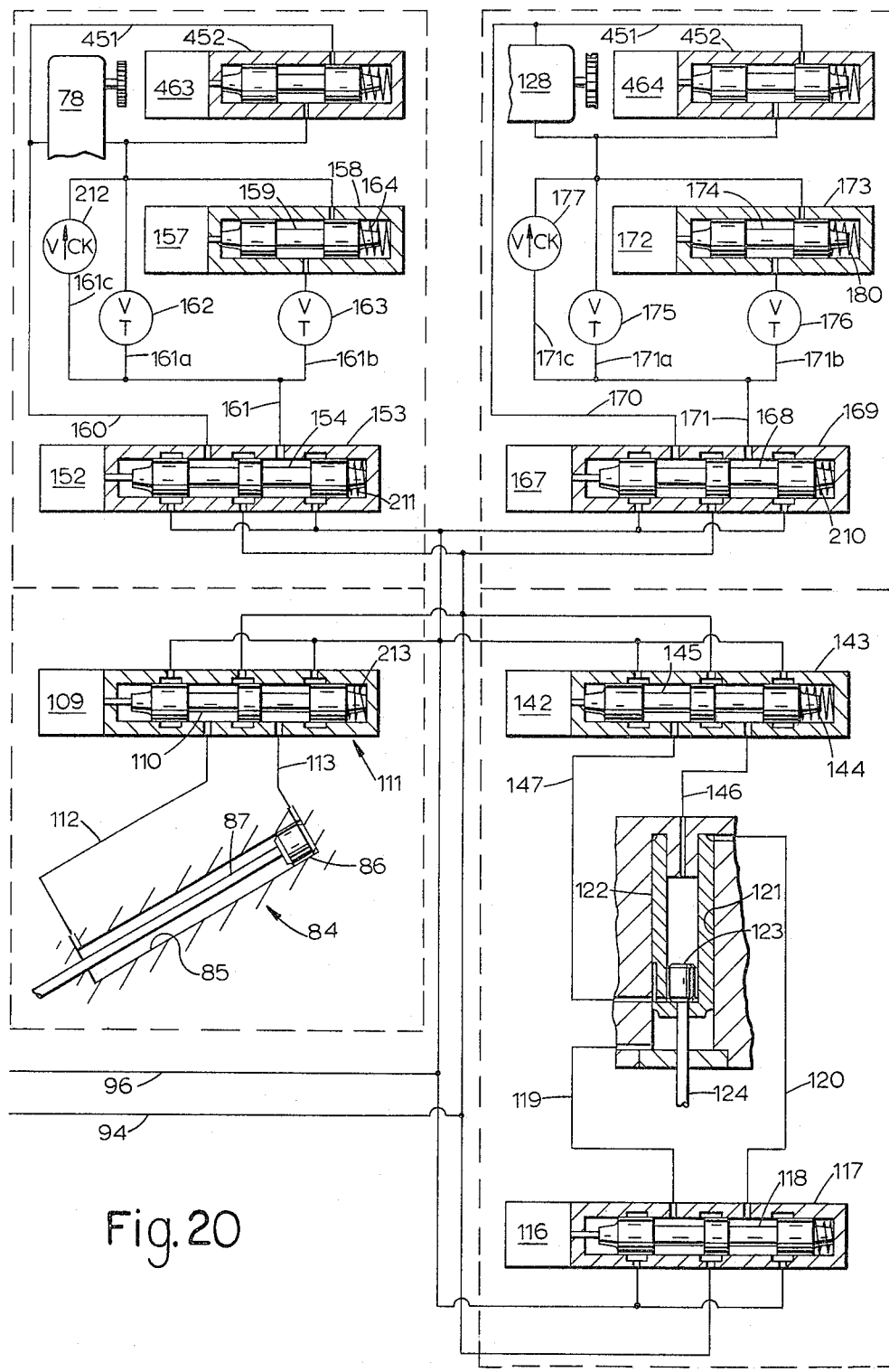

In the drawings:

FIG. 1 is a side view in elevation, partly broken away, for clarity, of the machine of the present invention;
FIG. 2 is a view taken on the line 2—2 of FIG. 1;
FIG. 3 is an enlarged view taken on the line 3—3 of FIG. 1;
FIG. 4 is an enlarged view taken on the line 4—4 of FIG. 1;
FIG. 5 is a view taken on the line 5—5 of FIG. 4;
FIG. 6 is a view taken on the line 6—6 of FIG. 4;
FIG. 7 is a view taken on the line 7—7 of FIG. 3;
FIG. 8 is a view taken on the line 8—8 of FIG. 7;
FIG. 9 is a view taken on the line 9—9 of FIG. 1;
FIG. 10 is an enlarged view taken on the line 10—10 of FIG. 9;
FIG. 11 is an enlarged view taken on the line 11—11 of FIG. 9;
FIG. 12 is a view taken on the line 12—12 of FIG. 1;
FIG. 13 is a view taken on the line 13—13 of FIG. 12;
FIG. 14 is a view taken on the line 14—14 of FIG. 12;
FIG. 15 is a view taken on the line 15—15 of FIG. 12;
FIG. 16 is a view taken on the line 16—16 of FIG. 3;
FIG. 17 is a schematic representation of the cams which actuate different elements of the machine;
FIGS. 18, 19, and 20 are schematic representations of hydraulic mechanisms of the machine; and
FIG. 21 is a chart showing the relationship between the operation of different elements of the machine.

There is shown in FIGS. 1 and 2 two views in elevation of a machine constructed in accordance with the present invention. The machine has seven operating stations: A (see FIG. 14), B, C, D, E, F, G (see FIG. 3), and each workpiece fed into the machine is moved intermittently through each of these stations, in succession, for an operation. In the specific embodiment of the invention illustrated, an annular bearing race 50 has seven operations performed thereon, in the following order: at station A the workpiece is loaded into the machine and one annular end face is ground; at station B the other annular end face is ground; at station C a rough grind is taken on the outer periphery; at station D a rough grind is taken on the inner periphery; at station E a finish grind is taken on the inner periphery; at station F a finish grind is taken on the outer periphery; and at station G the workpiece is gauged and removed from the machine. When the machine is fully loaded and operating on workpieces, there is a workpiece in each station and, with each new workpiece fed to the machine at station A, a completed workpiece is discharged from the machine at station G.

The seven operating stations are located in an opening 25 extending through the machine. At operating station A, as shown best in FIG. 14, a quill 26 is slidably received in frame 27 of the machine and extends into opening 25. Quill 26 has a pair of bearings 28 secured therein which receive a spindle 29. The nuts 30 on the spindle 29 hold the spindle against axial movement relative to quill 26 but permit rotation of the spindle in the quill. The spindle has an elongated gear portion 31 formed thereon which, in any axial position of the quill, meshes with a pinion 32. Pinion 32 is secured on stub shaft 33 which is journaled in frame 27 and which carries a pulley 34 thereon. Pulley 34 is driven through belts 35 which are received on a pulley 36 secured on drive shaft (see FIG. 1). The drive shaft 37, in turn, is driven through belts 38 by electric motor 39.

The quill 26, as shown in FIG. 12 and FIG. 14, has a nose piece 45 secured thereon which has a curved shoe support 46 secured thereto. Two spaced shoes 47 and 48 rigidly carried by the shoe support extend therefrom and support an annular workpiece 50 thereon. The spindle 29 has a magnetic chuck 51 thereon (of the type shown, for example, in U.S. Patent 2,864,622) which terminates in an annular face plate 52. Two wires 53, 54 lead from a source of D.C. current to two spaced apart brushes 55 in frame 27 which are continuously engaged respectively with two spaced apart parallel bus bars 56 mounted in quill 26. Each of the two bus bars is electrically connected with a brush 57 in the quill, and each of the brushes 57 is engaged with a ring 58 mounted on the spindle 29. The two rings 58 on the spindle are electrically connected to the magnetic chuck 51.

The shoes 47, 48, when engaged with the periphery of the workpiece, locate the workpiece in the plane containing the workpiece with the central longitudinal axis thereof at 60. The workpiece axis 60 is displaced from the central axis of revolution 61 of spindle 29 so that when one end of the workpiece is magnetically held against the flat annular face 52, the workpiece is urged into the shoes, as indicated by arrow 63, and rotated therein by the rotating spindle 29, which rotates counterclockwise as viewed in FIG. 12. In this type of work location and drive, which is described more fully in U.S. Patents 2,864,622 and 2,478,607, the workpiece can slide on the spindle face 52 and the radial position of the workpiece is determined soley by the position of the shoes 47, 48. The axial position of the workpiece is determined soley by the axial position of the face 52.

Raw, or unoperated, workpieces 50 are received in a loading chute 64 (see FIGS. 1, 12, 14, 15) which is located in opening 25. Chute 64 is secured to a shaft 65 journaled in frame 27. Shaft 65 has a pinion 66 secured thereon which is engaged by a rack 67. A motor 68 comprises a cylinder 69 in frame 27 which slidably receives a piston 70 having a piston rod 71 connected to the rack 67. Operation of the fixed stroke motor 68 (by connection of port 68a to pressure and connection of port 68b to the sump) will swing loading chute 64 counterclockwise as viewed in FIG. 12 to the loading position shown in dotted lines. When the loading chute 64 is in the loading position, the quill 26 must be in the fully retracted position with the shoes 47, 48 thereof adjacent the chute 64. When the magnetic chuck 51 is energized, the end workpiece in the chute 64 is drawn out of the chute and onto face 52, which, as it rotates, swings the workpiece into the shoes.

One end face of a workpiece is ground at station A and the other end face thereof is ground at station B. As shown best in FIG. 14, while one workpiece 50 is having the first, or inboard, end face ground at station A by the rotating grinding wheel 72, another workpiece 50 (previously operated on at station A) is having the second, or inboard, end face ground by the same grinding wheel at station B. At both stations, magnetic drivers engage the outboard ends of the workpieces for rotation thereof.

For understanding the operation of grinding wheel 72, reference is made to FIGS. 3, 4, and 6. The frame 27 of the machine has ways 75 which receive a slide 76 thereon for movement in a direction parallel to spindle 29. The slide 76 is threadedly engaged by a screw 77 journaled in frame 27. A motor 78 mounted in frame 27 is connected to screw 77 for rotation thereof through gears 79, 80. Manual rotation of screw 77 can be effected by handwheel 81 carried at the end of the screw. Mounted on slide 76 is a wheelhead slide 82 which has grinding wheel spindle 83 rotated by a motor (not shown) in the wheelhead. Slide 82 is moved transversely to the direction of movement of slide 76 by a motor 84 comprising a cylinder 85 in slide 76 and a piston 86 slidably received therein. Piston 86 is connected by rod 87 to slide 82.

During grinding, a workpiece at station B is held axially fixed, and, to effect a grind on the end face thereof, it is necessary for the grinding wheel 72 to move into the workpiece. To simultaneously grind a workpiece at station A with the same grinding wheel 72, it is necessary that the workpiece 50 in station A move into the grinding wheel 72 as the grinding wheel 72 is moving into the workpiece at station B. In other words, the grinding wheel 72 is fed toward the workpiece 50 in station B at a given feed rate and the workpiece 50 in station A is fed toward the workpiece 50 in station B at twice that given feed rate so that the workpiece 50 in station A is fed into the grinding wheel 72 at the same rate the grinding wheel 72 is fed into workpiece 50 in station B.

A control shaft 90 is connected through gear train 91 to shaft 37 for rotation. The shaft 90 has a plurality of cams mounted thereon to coordinate and control movement of various elements of the machine. For each workpiece machined at station A, the elements of the machine at station A must go through the following movements beginning with quill 26 and spindle 83 fully retracted and no workpiece in station A:

(a) Loader 64 raised,
(b) Magnetic chuck 51 energized to grip a workpiece 50,
(c) Loader 64 lowered,
(d) Spindle 83 fully advanced to position grinding wheel 72,
(e) Quill 26 advanced to an intermediate position to position a workpiece in station A close to grinding wheel 72,
(f) Spindle 83 and quill 26 simultaneously fed to the left (as viewed in FIG. 14) for grinding one face of workpiece at station A and simultaneously grinding the opposite face of a workpiece at station B,
(g) Feed movement reversed at end of grind,
(h) Spindle 83 fully retracted,
(i) Quill 26 fully advanced toward spindle at station B (which will have no workpiece therein when the workpiece on the end of spindle 29 reaches station B),
(j) Magnetic chuck 51 deenergized to transfer workpiece from spindle in station A to spindle in station B,
(k) Quill 26 fully retracted.

A hydraulic pump 92 (FIG. 18) takes fluid from a sump 93 and delivers it under pressure to a pressure line 94, the safety relief valve 95 being connected between line 94 and sump 93 to prevent the pressure in line 94 from exceeding a predetermined maximum. An exhaust, or return, line 96 returns fluid to sump 93. When cam 97 (FIG. 17) closes normally open switch 98, solenoid 99 is energized to shift valve member 100 of valve 101 to the right of the position shown (see FIG. 19). With valve member 100 to the right, pressure line 94 is connected through the valve to motor line 102, and return line 96 is connected through the valve to motor line 103. Motor line 102 is connected to port 68a and motor line 103 is connected to port 68b, as shown in FIG. 15, so that loading chute 64 is raised. When the loading chute is up with the end workpiece therein in closely spaced relation to the end of spindle 29, cam 104 (FIG. 17) closes switch 105 to energize magnetic chuck 51. At this time, cam 97 releases switch 98, deenergizing solenoid 99, and permitting spring 106 to shift valve plunger 100 to the position shown. This reverses the connection of pressure and return lines 94, 96 to motor lines 102, 103 and the loading chute 64 is swung to the position shown in solid lines in FIG. 12.

At the time the loader 64 starts to descend, cam 107 (FIG. 17) closes switch 108 to energize solenoid 109. This shifts valve plunger 110 (FIG. 20) of valve 111 to the right, connecting pressure line 94 to motor line 112 and connecting return line 96 to motor line 113. These connections to the motor lines of motor 84 shift wheelhead slide 82 upward (as viewed in FIG. 3) to bring grinding wheel 72 between stations A and B. As wheelhead 82 is advancing, cam 114 closes switch 115 to energize solenoid 116 of valve 117. This shifts valve member 118 to the right, as shown in FIG. 20, to connect pressure line 94 to motor line 119 and to connect return line 96 to motor line 120. As shown in FIG. 14, motor line 119 is connected to one end of a cylinder 121 and motor line 120 is connected to the other end thereof. A hollow piston 122, slidably received in cylinder 121, is shifted to the left therein (or up as shown in FIG. 20) as solenoid 116 is energized. The piston 122 slidably receives a second piston 123 therein. This latter piston has a nonrotatable rod 124 connected thereto which threadedly receives a nut 125 thereon. Nut 125 is rotatably received in the depending leg 126 of a bracket 127 connected to the rear of quill 26. A feed motor 128 on bracket 127 drives a gear 129 which is engaged with teeth 130 on nut 125. A compensation motor 131 is mounted in frame 27 to periodically rotate an elongated gear 132 which is engaged with the teeth 133 of stop 134 mounted on rod 124.

While the grinding wheel 72 is between stations A and B, cam 140 is disengaged from switch 141 (FIG. 17) so that solenoid 142 of valve 143 (FIG. 20) is deenergized. Thus spring 144 holds valve plunger 145 to the left as shown in FIG. 20 and pressure line 94 is connected to motor line 146 while return line 96 is connected to motor line 147. With motor line 146 connected to pressure and motor line 147 connected to exhaust, piston 123 is held at the right end of cylinder 122 as shown in FIG. 14. Thus, cylinder 122 is advanced and piston 123 is retracted so that quill 26 is held in an intermediate position close to grinding wheel 72.

A workpiece 50 in station B is held against axial movement, and grinding wheel 72 is fed to the left into the right end face thereof (as viewed in FIG. 14), initially at a fast feed rate and subsequently at a slow feed rate. To initiate feed movement of grinding wheel 72 into the end face of a workpiece in station B, cam 150 (FIG. 17) closes switch 151 to energize solenoid 152 of valve 153. This shifts valve plunger 154 to the right, as shown in FIG. 20. At the same time cam 155 closes switch 156 to energize solenoid 157 of valve 158, shifting valve plunger 159 of that valve to the right. With solenoid 152 energized, pressure line 94 is connected to motor line 160 and return line 96 is connected to motor line 161 to drive the rotary hydraulic motor 78 in a direction to feed slide 76 toward station B (to the left as viewed in FIG. 6). Return line 161 has three branches, branch 161a containing adjustable throttle valve 162, branch 161b containing adjustable throttle valve 163 and valve 158, and branch 161c containing chuck valve 212. Valve 158 is effective to block branch 161b unless solenoid 157 thereof is energized. Thus, at this time, with solenoid 157 energized, discharge from motor 78 is occuring through both branch lines 161a and 161b. When cam 155 releases switch 156 to deenergize solenoid 157, spring 164 shifts valve plunger 159 to the left, blocking branch line 161b and restricting all discharge from motor 78 to branch line 161a. Thus, grinding wheel 72 is fed into the end face of the workpiece at station B at a fast rate when both solenoids 157 and 152 are energized and at a slow rate when solenoid 152 is energized and solenoid 157 is deenergized.

Spindle 29 at station A is in axial alignment with the spindle at station B during grinding, and movement of quill 26 to the left (as viewed in FIG. 14), if effected at twice the rate of movement of grinding wheel 72 to the left, will result in a feed movement of a workpiece at station A into the grinding wheel 72 at the same rate as feed movement of grinding wheel 72 into a workpiece at station B. This movement of quill 26 is initiated by cam 165 (FIG. 17) closing switch 166 to energize solenoid 167. This shifts plunger 168 of valve 169 to the right, as shown in FIG. 20, for connection of pressure line 94 to motor line 170 and connection of return line 96 to motor line 171. Motor lines 170 and 171 are connected to motor 128 to rotate nut 125 for axial movement thereof and movement of quill 26 to the left as viewed in FIG. 14. Solenoid 172 of valve 173 is energized, by cam 178 (FIG. 17) closing switch 179, at the same time that solenoid 167 is energized, shifting plunger 174 to the right. Motor line 171 has three branches, 171a containing throttle valve 175, branch 171b containing throttle valve 176 and valve 173, and branch 171c containing check valve 177. With both solenoids 167 and 172 energized, discharge from motor 128 occurs through branch lines 171a and 171b. When cam 178, which controls solenoid 172 through switch 179, releases the switch to deenergize solenoid 172, spring 180 shifts plunger 174 to the left to block branch line 171b and slow down the rate of motor 128.

The extreme limit of movement of slide 76 to the left (as viewed in FIG. 6), and hence of grinding wheel 72 to the left, is established by a positive stop 190, and the extreme limit of movement of quill 26 to the left (as viewed in FIG. 14) and hence of workpiece 50 at station A, is established by the positive stop 134. As the grinding wheel 72 undergoes attrition by wear and/or truing, the positive stops 190 and 134 must be adjusted to compensate for this attrition. A compensation motor, similar to the motor 191 shown in FIGS. 9 and 11 is connected to each positive stop for periodic adjustment thereof. The motor 191 has a shaft 192 journaled therein carrying gear 193 and ratchet 194. Each time cam 195 (FIG. 17) momentarily closes switch 196, solenoid 197 of valve 198 (FIG. 19) is energized. This shifts plunger 199 to the right, connecting pressure line 94 to motor line 200 and connecting return line 96 to motor line 201. The motor lines 200 and 201 are connected to opposite ends of cylinder 202 which contains piston 203. Piston 203 is connected to pawl 204 which turns ratchet 194 an angular amount determined by the setting of screw 205 each time solenoid 197 is energized. This turns gear 190a of stop 190 and gear 132 at stop 134.

Stop 190 comprises a yoke 190b straddling a depending portion of slide 76. The arms of the yoke define the extreme limits of movement of slide 76. The yoke is threadedly received on a screw 190c connected to gear 190a, and a pin 190d loosely received in the depending portion of slide 76 prevents rotation of yoke 190b. Thus, on each incremental rotation of gear 190a, the yoke 190b is shifted a small amount to adjust the limits of movement of slide 76.

The stop 134 is defined by two gears 135 threadedly received in spaced apart relation on shaft 124. The two gears are engaged with gear 132 and, on each incremental rotation thereof, the two gears shift axially to shift the extreme limits of feed movement of quill 26.

After the advance of quill 26 and slide 76 has been stopped by stops 134 and 190, respectively, the quill and slide are reversed. This occurs when cam 165 releases switch 166 and cam 150 releases switch 151. When switch 166 opens, solenoid 167 is deenergized so that valve member 168 is shifted by spring 210 to the left, thereby connecting pressure line 94 to motor line 171 and connecting return line 96 to motor line 170. Fluid flows through branch line 171c and check valve 177 to run motor 128 oppositely to its direction of feed operation. Similarly, when switch 151 is released, solenoid 152 is deenergized, permitting spring 211 to shift valve member 154 to the left. Pressure line 94 is then connected to motor line 161 and return line 96 is connected to motor line 160. Fluid under pressure passes through branch line 161c and check valve 212 to operate motor 78 reversely to its direction of feed operation.

At this time cam 107 releases switch 108 to deenergize solenoid 109. This results in valve member 110 (FIG. 20) of valve 111 being shifted to the left by spring 213, connecting pressure line 94 to motor line 113 and connecting return line 96 to motor line 112. Thus slide 82 (see FIG. 4) is retracted, retracting grinding wheel 72. Subsequently, in a manner which will be explained more fully hereafter, the workpiece at station B previously ground is removed therefrom. Thereafter, cam 140 closes switch 141 to energize solenoid 142. This shifts valve plunger 145 of valve 143 (FIG. 20) to the right, connecting pressure line 94 to motor line 147 and connecting return line 96 to motor line 146. These connections advance piston 123 in piston 122, which is also advanced at this time, and quill 26 advances to bring the workpiece on spindle 29 against the spindle at station B. When this occurs cam 104 releases switch 105 to deenergize magnetic chuck 51, releasing the workpiece therefrom. The workpiece, however, is magnetically gripped at station B by a continuously energized magnetic clutch on the spindle at that station. After the transfer of the workpiece from station A to station B, cams 140 and 114 release, respectively, switches 141 and 115 to deenergize solenoids 142 and 116. Valve plungers 145 and 118 (FIG. 20) both shift to the left so that both piston 123 and piston 122 fully retract (to the right as viewed in FIG. 14), returning quill 26 to the fully retracted loading position.

As shown best in FIGS. 3 and 7, the machine has four parallel guide rods 215, 216, 217, 218 slidably received in the frame of the machine. The ends of the guide bars are secured to the corners of a vertical plate 219 received in opening 25 and extending across the machine. A block 220 is secured to plate 219 in the center thereof and extends therefrom on the side opposite the guide bars. Block 220 is connected, by rod 221, to a piston 222 (FIGS. 13 and 19) which is slidably received in a cylinder 223 in frame 27. When cam 224 (FIG. 17) closes switch 225, solenoid 226 is energized to shift valve plunger 227 to the right. This connects pressure line 94 to motor line 228 and connects return line 96 to motor line 229 to advance piston 222 (to the left as viewed in FIG. 13) and move plate 219 to the left as viewed in FIG. 7 (to the position shown in solid lines). When the cam 224 releases switch 225 to deenergize the solenoid 226, the valve plunger 227 is shifted to the left by spring 230, reversing the connection of the pressure and return lines 94, 96 to the motor lines 228, 229. This retracts piston 222 and shifts plate 219 to the right as viewed in FIG. 7 (to the position shown in dotted lines). Thus, the plate 219 shifts towards and from the viewer (in FIG. 3) but is securely held against any angular displacement by the four guide bars 215, 216, 217, and 218. It will be noted that drive shaft 37 (which has a central axis 242) passes through an opening 37a which extends through block 220.

The vertical plate 219 extends across the opening 25 and, as viewed in FIG. 3, six stations are equally angularly spaced around the axis 242. The plate 219 has an opening at each station: opening 231 at station B, opening 232 at station C, opening 233 at station D, opening 234 at station E, opening 235 at station F, and opening 236 at station G. A shoe supporting plate 237, having two shoes 238 and 239, is secured to plate 219 adjacent each of the openings 231, 232, 233, 234, 235, 236. Each pair of shoes will support a workpiece on an axis $x$.

As shown best in FIG. 7, there is secured in frame 27 two large bearings, 240 and 241 centered with respect to axis 242 of shaft 37 and spaced apart on that axis. A drum 243 is received in bearings 240 and 241 for rotation on axis 242. Shaft 37 is received in bearings 244 in a central opening 245 in drum 243. The drum has six parallel spindles 246 received therein, and each spindle is rotatably received in bearings 247 which are secured in the drum in spaced apart relation on an axis $y$. Each spindle has two nuts 248 thereon which straddle the bearings 247 and are engaged therewith to prevent axial movement of the spindles with respect to the drums. Each spindle rotates on axis $y$ and each has a magnetic chuck 252 at its forward end similar to chuck 51 and terminating in an annular end face 253 concentric with axis $y$. Shaft 37 has a pulley 249 at the end of the shaft beyond the drum, and each spindle has a pulley 250 in the same plane as the pulley 249. As shown best in FIG. 8, belts 251 driven by pulley 249 drive the pulleys 250 to continuously rotate the spindles. Thus, each end face 253 defines a magnetic driver which holds and rotates a workpiece received thereon.

The drum, or spindle carrier, 243 has a central web 260 thereon, the web having six equally angularly spaced bores 261 therein to receive plunger 262. The bores 261, when aligned with plunger 262, define six predetermined index positions of the drum. Plunger 262 is actuated by solenoid coil 263 and, when the coil is energized, the plunger extends into one of the bores to lock the drum in one of the predetermined angular index positions. When the coil is deenergized, the plunger retracts to permit rotation of the drum. Coil 263 is energized when cam 264 closes switch 265 and is deenergized when cam 264 permits the normally open switch 265 to open.

Since there are six bores 261, the drum can be locked in six different angular positions. In each of the locked positions of the drum, the spindles 246 are in registration with the six operating stations B, C, D, E, F, G, respectively. In each locked position of the drum, at each station, the axis $x$ of a workpiece 50 resting in the shoes 238, 239 is displaced from the axis $y$ of the spindle, the displacement occuring in a direction so that the rotation of the spindle, which is clockwise as viewed in FIG. 3 (and clockwise in FIG. 8 as indicated by arrows 246a) will not only rotate the workpiece, but will urge the workpiece into the shoes. Thus, at station C, the central axis $y$ of the spindle is to the right of the central axis $x$ of the workpiece, so that as the spindle rotates clockwise, the workpiece is urged up into the shoes which are above the workpiece. Conversely, at station F, the central spindle axis $y$ of rotation is to the left of the central axis $x$ of the workpiece so that the workpiece is continuously urged downwardly into the shoes which, at this station, are below the workpiece. It should be noted all the central axes of the spindles lie on a circle having a center on the central axis 242 of rotation of the drum so that, as the drum is rotated from one predetermined angular position to the next, each spindle occupies exactly the same position in any given station as the preceding spindle.

The magnetic drivers 252 on each spindle are continuously energized and, to accomplish this, electrical current must be continuously supplied to the rotating drum and to each rotating spindle therein. To this end, as shown in FIG. 7, the rotating drum 243 has a ring 275 connected thereto centrally with respect to axis 242 of shaft 37. Ring 275, in turn, has two concentric rings 276, 277 mounted thereon, each continuously engaged with one of the two brushes 278 mounted in bracket 279 connected to the frame. The two brushes 278 are connected to a source of electrical energy, and the two rings 276, 277 are electrically connected, respectively, to a plurality of pairs 280 of brushes, each pair mounted on ring 275 adjacent a spindle as shown best in FIG. 8. Each spindle has a pair of rings 281 engaged, respectively, with the pair of brushes 280 and the rings 281 are electrically connected through the spindle to the magnetic chuck 252 for energization thereof.

The shaft 90, which is rotated by shaft 37 through gear train 91, as shown best in FIG. 1, and supported in the frame 27 by pedestal 287, has an arm 288 on one end thereof, as shown best in FIG. 8. The arm is continuously swung by shaft 90 and, on each revolution thereof, a roller 289 on the end of the arm enters one branch 290a of a track 290 on gear wheel 291. The wheel 291 is rotatably mounted in a forked bracket 291a connected to the frame of the machine and has gear teeth 292 engaged with gear teeth 293 on ring 275 on the drum 243. Gear wheel 291 has four radial right angle tracks 290a, 290b, 290c, and 290d in the form of a cross which connect at the center. When the drum is locked by plunger 262 (in any of the six predetermined angular positions where the spindles are at the work stations) two opposite tracks (say 290a and 290c) lie on an axis 295 and the other two tracks 290b, 290d lies on an axis 296 perpendicular thereto.

The cams shown in FIG. 17 are all mounted on shaft 90 so that each cam makes a full revolution as the shaft 90 (and arm 288) makes a full revolution. Just before roller 289 enters track 290a, cam 264 releases switch 265 to deenergize the drum plunger 262 and release the drum for rotation. It will be noted that shaft 90 lies closer to axis 295 than to axis 296 so that as the roller 289 enters track 290a, the gear wheel 291 is rotated a slight amount (2 or 3 degrees) clockwise (as viewed in FIG. 8). As the arm 288 continues to rotate, the roller 289 hits the lower edge of track 290a, swinging the gear wheel 291 counterclockwise. At this time cam 264 again closes switch 265 to actuate the drum plunger 262. However, the drum will not be locked until the next bore 261 swings into registration with the plunger. This will occur when the arm 288 is in the position 288b. At that time, the track 290a will be 90 degrees counterclockwise from the position shown (that is, in the position of track 290d in FIG. 8). Thus from the time arm 288 enters track 290a until the time it leaves track 290a, the gear wheel will turn, say, 3 degrees clockwise, as indicated by arrow 291b, and 93 degrees counterclockwise, as indicated by arrow 291c, for a net rotation of 90 degrees. Three degree clockwise rotation of gear wheel 291 produces two degree counterclockwise rotation of drum 243 (as viewed in FIGS. 8 and 3) as indicated by arrow 243a; 90 degree net rotation of gear wheel 291 counterclockwise will effect a 60 degree net rotation clockwise of the drum 243 (as viewed in FIGS. 8 and 3) as indicated by arrow 243b.

Grinding operations occur simultaneously at stations A, B, C, D, E, and F and, at the same time, an internal and external gaging tool measures the finished workpiece at station G. After the tools withdraw from the workpieces at the work stations, the drum rotates two degrees, shifting the circle of spindles two degrees counterclockwise, as viewed in FIG. 3. It will be noted that the shoes at each station are on the clockwise side of the workpieces magnetically held by the spindles. Thus, the slight rotation of the drum and spindles counterclockwise lifts the workpieces off the shoes. At that moment, the plate 219 is retracted (as indicated by dotted lines in FIG. 7), clearing the workpieces on the spindles. Then the drum, and the circle of spindles therein, rotate clockwise to carry the workpieces on the respective spindles toward the next work stations.

As the drum is rotating, cam 224 again closes switch 225, energizing solenoid 226 to advance plate 219. By this time, the spindles are in registration with the large holes 231, 232, 233, 234, 235, and 236 in the plate 219. After the plate reaches its fully advanced position, the drum swings to a predetermined index position where the plunger 262 slides into a bore 261 to lock the drum. The final movement of the drum, before the drum is locked, swings the workpieces into the shoes at the respective stations.

After the second end face of the workpiece is ground at station B, the workpiece is transferred to station C when the drum rotates. At station C, a slide 300 (see FIGS. 4 and 5) is mounted on the frame and has a depending portion threadedly engaged with a feed screw 301 which is journaled in the frame. Feed screw 301, which has a handwheel 302 at one end, is connected by gears 303, 304 to a feed motor 305 for rotation thereby. Another slide 306 is mounted on slide 300 and can be adjusted laterally with respect to slide 300 by means of handwheel 307 which is connected to a screw 308 and journaled in slide 300. A wheelhead 309 is mounted on slide 306 and is shiftable thereon between a fully retracted position and a fully advanced position by means of position motor 310 defined by cylinder 311 and piston 312. When cam 313 (FIG. 17) closes switch 314 to energize solenoid 315, the plunger 316 of valve 317 (FIG. 18) is shifted to the right. This connects pressure line 94 to motor line 318 through valve 317. At the same time motor line 319 is connected through valve 317 to return line 96. With pressure in motor line 318, and motor line 319 connected to the return line, the piston 312 is advanced to advance the grinding wheel 320 mounted in the wheelhead toward the workpiece. When cam 313 releases switch 314 to deenergize solenoid 315, spring 321 shifts plunger 316 to the left, reversing the pressure conditions in lines 318 and 319 to retract the grinding wheel 320 from the work and out of the path of the shiftable plate 219.

The grinding wheel 320 at station C is for effecting a rough grind on the external periphery of the workpieces and grinding wheel 321 at station F is for effecting a finish grind on the same surface. The mechanism at station F may be similar to the mechanism at station C with a positional motor 322 corresponding to motor 310 and a feed motor 323 coresponding to feed motor 305 (see FIG. 19). As shown in FIG. 18 positional motor 322 is connected to motor lines 318 and 319 for advance and retraction of the wheelhead 324 and grinding wheel 321 at station F simultaneously with advance and retraction of the wheelhead 309 and grinding wheel 320 at station C.

After the plate 219 is advanced toward the drum (to the left as viewed in FIG. 7), the two positional motors at stations C and F are actuated to advance the grinding wheels 320 and 321 toward the workpieces. Thereafter, cams 330 and 331 (FIG. 17) close switches 332 and 333, respectively, energizing solenoid 334 and 335. The energization of relays 334 and 335 shift plungers 336 and 337 of valves 338, 339 (FIG. 19) to the right to connect pressure line 94 to motor lines 340 and 341, respectively. Motor line 340 is connected to one side of rotary hydraulic feed motor 305 and motor line 341 is connected to one side of rotary hydraulic feed motor 323. Motor line 342, which is connected between motor 305 and valve 338, has three parallel branches 342a, 342b, and 342c. Branch line 342a contains blocking valve 343 and throttle valve 344; branch line 342b contains throttle valve 345; and branch line 342c contains check valve 346. A similar network is connected between motor 323 and valve 339. Motor line 347 has three parallel branches 347a, 347b, and 347c. Branch 374a contains blocking valve 348 and throttle valve 349; branch 347b contains throttle valve 350; and branch 347c contains check valve 351.

At the same time solenoids 334 and 335 are energized to shift plungers 336 and 337 to the right, cams 352 and 353 are closing switches 354 and 355 to energize solenoids 356 and 357. With solenoids 356 and 357 energized, both plungers 358 and 359 of valves 343 and 348 are shifted to the right. At this time, then, discharge from motor 305 occurs through branch lines 342a and 342b, and discharge from motor 323 occurs through branch lines 347a and 347b. Thus the two motors move the two wheelheads towards the workpieces at fast feed rates. When cams 352 and 353 release switches 354 and 355 to deenergize solenoids 356 and 357, branch lines 342a and 347a are blocked, reducing the feed speed.

After a workpiece is ground at station C, it is transferred to station D on the spindle which magnetically grips it for a rough grind on its inner periphery. After the rough grind is completed, the workpiece is transferred on the next incremental rotation of the drum to station E for a finish grind. To this end a slide 360 (see FIGS. 3, 7, 9, 10) is mounted on one face of block 220 for movement towards and away from a workpiece at station D by motor 361, comprising cylinder 362 and a piston 363 connected to the slide. Similarly a slide 364 (FIG. 3) is mounted on another face of block 220 for movement towards and away from a workpiece at station E by motor 365. Each slide 360, 364 has a wheelhead 366, 367 mounted thereon for movement latterly to the direction of movement of the slide. Each wheelhead 366, 367 has a rotatable spindle which carries grinding wheel 370, 371, and when the slides are advanced by motors 361, 365 the grinding wheels are inserted inside workpieces rotating in the shoes at stations D and E.

Feed movement of the grinding wheels into the workpieces is effected by feed motors 372, 373 mounted inside slides 360, 364. In each slide, a feed screw 374 is journaled and threadedly engaged with the wheelhead as shown in FIG. 9. Feed screw 374 is rotated by the feed motor through gears 375 and 376.

As the drum 243 is rotating, slides 360, 364 are fully retracted. After the drum has been locked by plunger 262 and workpieces are rotating in the shoes at stations D and E, cam 381 (FIG. 17) closes switch 382 to energize solenoid 383. This shifts plunger 384 of valve 385 to the right, as shown in FIG. 18, and connects pressure line 94 to motor line 386 which is connected to one side of motor 361 and motor 365. At the same time, motor line 387, which is connected to the other side of motors 361 and 365, is in communcation through valve 385 with return line 96. Thus, as solenoid 383 is energized, slides 360, 364 are advanced to bring grinding wheels 370, 371 inside the workpiece.

After the grinding wheels are inside the workpieces, cams 390 and 391 (FIG. 17) close switches 392 and 393 to energize solenoids 394, 395. The energization of solenoids 394, 395 shift plungers 396, 397 of valves 398, 399 (FIG. 18) to the right, connecting pressure line 94 to motor line 400 and 401 and return line 96 to motor line 402 and 403. Motor line 402 has three parallel branches: 402a containing blocking valve 404 and throttle valve 405, branch 402b containing throttle valve 406, and branch 402c containing check valve 407. Motor line 403 has three parallel branch lines: 403a containing blocking valve 408 and throttle valve 409, branch 403b containing throttle valve 410, and branch line 403c containing check valve 411.

Motor lines 400 and 402 are connected to opposite sides of rotary hydraulic motor 372 and motor lines 401 and 403 are connected to opposite sides of rotary hydraulic motor 373. When solenoids 394, 395 are energized to initiate feed movement, cams 412 and 413 close switches 414, 415 to energize solenoids 416, 417. This shifts plungers 418, 419 of valves 404, 408 to the right so that, at this time, discharge from motor 372 occurs through branch lines 402a and 402b, and discharge from motor 373 occurs through branch lines 403a, 403b. When cams 412 and 413 release switches 414, 415 to deenergize solenoids 416, 417, springs 420, 421 shift plungers 418, 419 to the left to block branch lines 402a and 403a, slowing the motors 372 and 373.

The workpiece is completely ground when it reaches station G, where it is gaged. At that station, a gage body 430 is mounted on a face of block 220. The gage body has an internal sensing member 431 and one or more external sensing member 432. The sensing members may be pneumatic probes from which a stream of air is discharged, the pressure of the air upstream from the discharge orifice indicating the distance of the measured surface from the probe, and hence indicating the size of the workpiece, as is well known in the art. The gage may produce an electrical signal if a workpiece is under or over size which stops the machine or initiates adjustment of the machine. For illustrating the machine of the present invention, however, two pointers 433 and 434 are shown which give visual indication of the internal and external diameter of the workpiece. When cam 435 closes switch 436 to energize solenoid 437, plunger 438 of valve 439 (FIG. 19) is shifted to the right. This connects pressure line 94 to motor line 440. At the same time motor line 441 is connected through the valve to return line 96. Motor lines 440 and 441 are connected to opposite sides of hydraulic motor 442 which consists of cylinder 443 in block 220 and piston 444 slidably received in the cylinder and connected to member 430.

As the drum rotates from the gaging station G, workpieces hit discharge chute 450 and slide off the spindle into the chute.

At many of the stations, rotary hydraulic motors are connected to feed screws which have handwheels connected thereto for manual rotation of the feedscrew during adjustment or set up of the machine. To facilitate manual rotation of the rotary hydraulic motors, a short circuit hydraulic line 451, which is normally blocked by blocking valve 452, has been connected across the motors. When the switches 453, 454, 455, 456, 457, 458 are closed, the respective solenoids 459, 460, 461, 462, 463, 464 are energized. Energization of each of these solenoids opens the blocking valve 452 across the feed motor at one of the stations, and manual rotation of the feed screw at that station is made easier for adjustment at that station.

The simultaneous grinding of workpieces at stations A and B with the grinding wheel 72 requires the coordinated movement of wheelhead 82 and quill 26 as has been described. The movements of wheelhead 82 and quill 26 must also be coordinated with the movement of plate 219 which, in turn, is coordinated with the rotation of the spindle carrier, or drum, 243. It will be noted that the control shaft 90, which rotates continuously, effects an incremental rotation of the drum 243 on each rotation of shaft 90 and, through the cams shown in FIG. 17, initiates operation of each element of the machine. The coordination between operation of the machine elements is shown best in FIG. 21.

Shaft 90 rotates clockwise (as viewed in FIG. 8 and indicated by arrow 90a) and may be considered as at zero degrees when the arm 288 is in position 288b. At this time, as indicated by FIG. 21, (a) Plate 219 is fully advanced (to the left as viewed in FIG. 7),
(b) The drum 243 is locked,
(c) All wheelheads are fully retracted,
(d) Loading chute 64 is down, and
(e) Quill 26 is advancing toward station B with a workpiece on spindle 29 as previously described.

Spindle 29 of station A is axially aligned with spindle 246 at station B when the drum 243 is locked in an index position, as it is when the quill 26 approaches station B (see FIG. 21). It will be noted that the workpiece 50 on spindle 29 is displaced from centered relation therewith and is located by the shoes on quill 26. Since the shoes on quill 26 are in a different sector than the shoes on plate 219 at station B, the workpiece on spindle 29 will be received into station B without interference. The workpiece, when transferred to the spindle in station B, will be displaced from centered relation therewith, and will be swung into the shoes at station B as the magnetic face plate, which slidably grips the workpiece, rotates.

At this time, the wheelheads 309 at station C, 366 at station D, 367 at station E, and 324 at station F, as well as gage 430 at station G, advance toward the workpieces at the respective stations. After the positioning movement of these wheelheads is completed, the feeding movement thereof begins.

As the control shaft 90 continues to rotate, a new workpiece is transferred to spindle 29, and the simultaneous grind of the end faces of workpieces at stations A and B is effected by grinding wheel 72.

When the grind operations at all the stations are completed, the drum is rotated two degrees counterclockwise, as viewed in FIG. 8, to lift the workpieces off the shoes 238, 239 at stations B, C, D, E, F, and G. With the workpieces off the shoes, the plate 219 (and the shoes mounted thereon) is retracted (that is, shifted to the right as viewed in FIG. 7). Thereafter, the drum is rotated clockwise (as viewed in FIG. 8). The incremental rotation of the drum is the same angular span as the angular distance between spindles 246 in the drum (and the same as the angular span between adjacent operating stations). As the drum near completion of an index movement, the plate 219 is advanced to shift all of the workpiece supporting shoes to a position in each operating station to receive the approaching workpiece. As the drum completes its incremental rotation, each workpiece carried thereby is located by the shoes in an operating station and is rotated by the drum spindle which magnetically but slidably grips the workpiece.

Thus, each workpiece is fed, in turn, into station A, transferred to station B by quill 26, and then carried in steps by carrier 243 from station B, to station C, to station D, to station E, to station F, to station G, and into discharge chute 450. Progressive grinding operations are effected on each workpiece at successive stations (for example, a rough grind on the outer periphery at station C and a finish grind on the outer periphery at station F) except for station G where a gaging operating is performed. Seven different operations occur simultaneously, six different grinding operations and a gaging operation.

What is claimed is:

1. A grinding machine comprising in combination:
   (a) a plurality of workpiece supports to define fixed operating positions for workpieces received therein, said operating positions lying in a circle about a central axis,
   (b) a carrier rotatable about said axis and having a plurality of predetermined angular index positions, said carrier having a circular array of rotatable driving faces positioned thereon for location at said operating positions when the carrier is in an index position,
   (c) means to urge a workpiece against each driving face for driving rotation of the workpiece on rotation of the driving face and for conveyance of the workpiece on rotation of the carrier,
   (d) a rotating grinding wheel at some of said supports for abrading engagement with workpieces in operating positions,
   (e) and means periodically to rotate said carrier from successive index positions and having a plurality of workpieces between operating positions.

2. A grinding machine comprising in combination:
   (a) a spindle carrier rotatable about a central axis to successive index positions ond having a plurality of rotatable spindles terminating in end faces, said end faces lying on a circle having a center in said axis and equally spaced about said axis, each of said end faces having means to slidably grip one end of a workpiece for conveyance and driving rotation thereof,
   (b) means periodically to rotate said spindle carrier for index movement from one index position to another to effect conveyance of the workpieces,
   (c) a support member adjacent the spindle carrier having a plurality of workpiece supports arrayed around the axis of the spindle carrier, said supports positioned for locating engagement by workpieces driven by said spindles when the spindle carrier is in an index position,
   (d) means to effect relative reciprocation in the axial direction between the spindle carrier and the support member to provide clearance between the workpieces and the supports during index movement,
   (e) and a rotating grinding wheel at some of said supports for abrading engagement, respectively, with the spindle driven workpieces located by said supports.

3. A grinding machine comprising in combination:
   (a) a spindle carrier rotatable about a central axis to successive index positions and having a plurality of rotatable spindles terminating in end faces lying in a common plane normal to said axis, said end faces lying on a circle having a center in said axis and equally spaced about said axis, each of said end faces having means to slidably grip one end of a workpiece for conveyance and driving rotation thereof,
   (b) means periodically to rotate said spindle carrier for index movement from one index position to another to effect conveyance of the workpieces,
   (c) a support member adjacent the spindle carrier having a plurality of workpiece supports lying in a common plane normal to the spindle carrier axis and arrayed around said axis, the plane of said supports adjacent the plane of said spindle faces when the spindle carrier is in an index position for location by the supports of workpieces driven by the spindles,
   (d) means to effect relative shifting in the axial direction between the spindle carrier and the support member at the beginning of each index movement of the spindle carrier to separate the plane of the spindle faces from the plane of the supports and provide clearance between the workpieces and the supports and to effect a reverse relative axial shifting therebetween after the workpieces have cleared the supports to draw said planes together and provide location of the workpieces by the supports at the next index position of the spindle carrier,
   (e) and a rotating grinding wheel at some of said supports for abrading engagement, respectively, with the spindle driven workpieces located by said supports.

4. A grinding machine for forming circular workpieces comprising in combination:
   (a) a spindle carrier rotatable about a central axis to successive index positions and having a plurality of rotatable spindles terminating in end faces lying in a common plane normal to said axis, said end faces lying on a circle having a center in said axis and equally spaced about said axis, said end faces having means to slidably grip, respectively, the ends of workpieces to hold the said workpieces in a common plane for conveyance thereof along a circular path in said common plane and for driving rotation thereof,
   (b) means periodically to rotate said spindle carrier in a predetermined index direction for index movement thereof from one index position to another to effect conveyance of the workpieces, (c) a support member adjacent the spindle carrier having a plurality of arcuate workpiece supports lying in a common plane normal to the spindle carrier axis, the plane of said supports coinciding with the plane of the workpieces when the spindle carrier is in an index position, (d) means to effect relative shifting in the axial direction between the spindle carrier and the support member at the beginning of each index movement of the spindle carrier to provide clearance between the workpieces and the supports and to effect a reverse relative axial shifting therebetween as the spindle carrier approaches the end of the index movement for locating engagement of the workpieces by the supports, (e) and a rotating grinding wheel at some of said supports for abrading engagement, respectively, with the spindle driven workpieces located by said supports.

5. A grinding machine comprising:

(a) a plurality of operating stations located at predetermined positions around an axis, each operating station comprising
  (1) a workpiece support and
  (2) a grinding wheel movable relative to said support, (b) a workpiece carrier rotatable about said axis and having rotatable magnetic driving faces each operable to slidably grip one end of a workpiece, said faces equally spaced from said axis and positioned on said carrier to drive workpieces on the supports when said carrier is in predetermined index positions, (c) means periodically to rotate the carrier from one index position to another to convey the workpieces from one operating station to another, (d) and means to effect feed movement of the grinding wheels when the carrier is in an index position.

6. A grinding machine comprising in combination:

(a) a carrier rotatable about an axis and having a plurality of predetermined angular index positions, said carrier having a circular array of equally angularly spaced parallel rotatable spindles, each spindle terminating in a driving face, said driving faces located at operating stations when the carrier is stopped in an index position, (b) means to urge a workpiece against each driving face for driving rotation of the workpiece on rotation of the spindles and for conveyance of the workpiece in a circular path between operating stations on rotation of the carrier, (c) a plurality of shoes at the operating stations shiftable with respect to the path of the workpieces conveyed by the carrier, said shoes advanced into said path as the carrier approaches an index position to receive and locate workpieces in the operating stations for grinding, said shoes retracted from said path after grinding to permit conveyance of the workpieces, and (d) means to rotate the carrier a small amount in one direction before the shoes are retracted to lift the workpieces out of the shoes and to rotate the carrier in the other direction after the shoes are retracted for conveyance of the workpieces between operating stations.

7. A grinding machine comprising in combination:

(a) a carrier drum rotatable about an axis and having a plurality of predetermined angular index positions, said drum having rotatably mounted therein a circular array of equally angularly spaced spindles parallel to said axis, said spindles located at operating stations when the drum is stopped at an index position and each spindle terminating in a magnetic driving face normal to the spindle axis, (b) a plate normal to said axis and adjacent said driving faces, said plate having shoes at the operating stations and shiftable axially relative to the drum to move said shoes into and out of the path of the workpieces, said plate advanced to move said shoes into said path as the carrier approaches an index position to receive and locate workpieces in the operating stations for grinding, said plate retracted to remove the shoes from the path of the workpieces after grinding to permit conveyance of the workpieces, and (c) means to rotate the carrier a small amount in one direction to lift the workpieces out of the shoes and to rotate the carrier in the other direction for conveyance of the workpieces between operating stations.

8. A grinding machine comprising in combination:

(a) a carrier having a circular array of equally angularly spaced rotatable magnetic faces defining workpiece drivers, said carrier rotatable about an axis and having a plurality of predetermined angular index positions for movement of each of said drivers in a circular path to successive operating stations, (b) a pair of shoes at each operating station shiftable into the path of a workpiece on a driver to locate and support the workpiece at the operating station as the workpiece is rotated in the shoes by the driver for grinding, said shoes shiftable out of the path of the workpiece on the driver for conveyance of the workpiece to the next operating station on rotation of the carrier, and (c) means to load workpieces one at a time into one operating station of the machine, (d) and means to remove workpieces from the machine at another operating station thereof.

9. A grinding machine comprising in combination:

(a) means to load workpieces into the machine at a first operating station, (b) a carrier drum rotatable about an axis and having a plurality of predetermined angular index positions, said drum having rotatably mounted therein a circular array of equally angularly spaced spindles parallel to said axis, each of said spindles movable to said first operating station as said drum is successively rotated to said predetermined index positions, each of said spindles terminating in a magnetic driving face normal to the spindle axis, (c) a plate normal to the drum axis and adjacent said driving faces, said plate having a pair of shoes at each operating station, said plate shiftable axially with respect to the drum to shift the shoes into the path of workpieces conveyed into the operating stations by rotation of the drum, said shoes positioning and supporting the workpieces at the respective operating stations, said plate shiftable to remove the shoes from the path of the workpieces, (d) means to rotate the drum a small amount in one direction to lift the workpieces off the shoes and to rotate the drum in the other direction to convey each workpiece from one operating station to the next, (e) and means to remove a workpiece from the machine at the final operating station.

10. A grinding machine for progressively operating simultaneously on a plurality of workpieces comprising in combination:

(a) a plurality of workpiece supports arrayed in a circle to define a plurality of equally angularly spaced operating stations, (b) a plurality of grinding wheels mounted, respectively, at some of said operating stations for progressive grinding operations on workpieces successively supplied to the operating stations, each of said grinding wheels movable with respect to the workpiece mounted on the support for effecting the grind thereon, (c) a carrier rotatable about an axis and having a plurality of driving faces angularly spaced equally to the operating stations, (d) means to hold the carrier against rotation in a plurality of index positions, each operating station having a driving face therein when the carrier is held in an index position, (e) means to urge workpieces against the driving faces for rotation of the workpieces in the workpiece supports when the carrier is in an index position and for transport of workpieces progressively from operating station to operating station when the carrier is rotated, (f) and means to coordinate rotation of the carrier and movement of the grinding wheels for simultaneous grinding of a plurality of workpieces at different operating stations when the carrier is held against rotation.

11. A grinding machine for progressively operating simultaneously on a plurality of workpieces comprising in combination:

(a) a plurality of pairs of workpiece supporting shoes arrayed in a circle to define a plurality of equally angularly spaced operating stations, (b) a plurality of grinding wheels mounted, respectively, at some of said operating stations for progressive grinding operations on workpieces successively supplied to the operating stations, each of said grinding wheels movable with respect to the workpiece mounted on the workpiece support for effecting the grind thereon, (c) a drum rotatable about an axis and having a plurality of parallel spindles angularly spaced equally to the operating stations, said spindles each terminating in a driving face, (d) means to lock the carrier against rotation in a plurality of index positions, each operating station having a driving face therein when the carrier is locked, (e) a magnet in each driving face to urge the workpieces against the driving faces for rotation of the workpieces in the workpiece supporting shoes when the carrier is in an index position and for transport of workpieces progressively from operating station to adjacent operating station when the carrier is rotated an incremental amount from one index position to the next, (f) and means including a rotating control shaft to coordinate incremental rotation of the drum and movement of the grinding wheels for simultaneous grinding of a plurality of workpieces at different operating stations when the drum is locked in an index position.

12. In a machine tool organization, the combination comprising:

(a) a first rotatable chuck having means to grip a workpiece for an operation thereon, (b) a second rotatable chuck having means to grip a workpiece for an operation thereon, (c) means to shift said first chuck to said second chuck and to disable said first chuck for transfer of a workpiece from said first chuck to said second chuck.

13. In a machine tool organization, (a) a first magnetic chuck rotatable about a first axis and having means at one end to grip a workpiece for an operation thereon, (b) a second magnetic chuck rotatable about a second axis parallel to said first axis, said second magnetic chuck having means at the end facing said first chuck to grip a workpiece for an operation thereon, (c) means to shift said first chuck axially to said second chuck and to disable said first chuck for transfer of a workpiece from said first chuck to said second chuck.

14. A grinding machine comprising in combination:

(a) a carrier rotatable about an axis and having a plurality of predetermined angular index positions, said carrier having a circular array of rotatable driving faces, (b) means to urge a workpiece against each driving face for driving rotation of the workpiece on rotation of the driving face and for conveyance of the workpiece in a circular path on rotation of the carrier, (c) a plurality of shoes positioned in the circular path of the workpieces conveyed by the carrier, the shoes locating and supporting the workpieces for grinding when the carrier is stopped in an index position, and (d) means to rotate the carrier in one direction to lift the workpieces off the shoes and to rotate the carrier in the other direction to advance the workpieces with respect to the shoes.

15. A grinding machine comprising in combination:

(a) a plurality of workpiece supports arrayed in a circle to define a plurality of operating stations, (b) a grinding wheel at some of said operating stations to grind workpieces received in said supports, (c) a carrier having a plurality of angularly spaced rotating driving faces thereon, said driving faces positioned at operating stations when the carrier is stopped in predetermined index positions, (d) means periodically to rotate the carrier between index positions, (e) means to urge workpieces against the driving faces for rotation of the workpieces in the supports at the operating stations when the carrier is in an index position and for conveyance of workpieces between operating stations when the carrier is rotated, (f) means to effect a relative shifting between said driving faces and said workpieces supports to provide clearance for workpieces conveyed from operating station to operating station, (g) and means to effect a reverse relative shifting between said driving faces and said workpiece supports to establish engagement of the workpieces by the supports at the operating stations.

16. A grinding machine comprising in combination:

(a) a plurality of workpiece supports arrayed in a circle to define a plurality of equally spaced operating stations, (b) a grinding wheel at some of said operating stations to grind workpieces reecived in said supports, (c) a carrier rotatable about the center of said circle and having a circular array of equally angularly spaced rotating driving faces, said driving faces positioned at operating stations when the carrier is stopped in predetermined index positions, (d) means periodically to rotate the carrier between index positions, (e) means to urge workpieces against the driving faces for rotation of the workpieces in the supports at the operating stations when the carrier is in an index position and for conveyance of workpieces between operating stations when the carrier is rotated, and (f) means to shift each workpiece support into and out of the path of workpieces on the carrier.

17. A grinding machine comprising in combination:

(a) a plurality of workpiece supports arrayed in a circle to define a plurality of equally spaced operating stations, (b) a grinding wheel at some of said operating stations to grind workpieces received in said supports, (c) a drum rotatable about the center of said circle and having a circular array of equally angularly spaced rotating spindles, said spindles angularly spaced for alignment with the operating stations when the drum is stopped in predetermined index positions, (d) means periodically to rotate the drum between index positions, (e) magnets on the spindles to urge workpieces thereagainst for rotation of the workpieces in the supports at the operating stations when the drum is in an index position and for conveyance of the workpieces between operating stations when the drum is rotated between index positions, and (f) means to shift the workpiece supports into and out of the path of workpieces on the drum in coordination with rotation of the drum.

18. In a grinding machine, the combination comprising:
(a) a first workpiece support to receive and locate a circular workpiece on an axis, said first workpiece support lying in a predetermined sector,
(b) a second workpiece support axially spaced from said first workpiece support to receive and locate a circular workpiece, said second workpiece support lying in a different sector than said first workpiece support,
(c) a first rotatable magnetic driver face located for engagement with the end of the workpiece in the first workpiece support more remote from the second workpiece support,
(d) a second rotatable magnetic driver face located for engagement with the end of the workpiece in the second workpiece support more remote from the first workpiece support,
(e) a grinding wheel between said first and second workpiece supports to grind the other ends of the workpieces in said supports,
(f) means to feed the grinding wheel into the end of the workpiece in the first support,
(g) means to feed the end of the workpiece in the second support into the grinding wheel,
(h) means to shift said second workpiece support and second magnetic driver to said first workpiece support,
(i) and means to render said second magnetic driver ineffective to grip a workpiece for conveyance of a workpiece from the second workpiece support to the first workpiece support.

19. In a grinding machine, the combination comprising:
(a) a carrier having a circular array of rotatable driving faces thereon,
(b) means to urge workpieces against said rotatable driving faces,
(c) a plurality of spaced apart grinding wheels,
(d) a plurality of workpiece supports to engage workpieces or the driving faces for location of the workpieces during grinding,
(e) and means periodically to index said carrier.

20. In a grinding machine, the combination comprising:
(a) a drum having a circular array of parallel spindles,
(b) a magnetic driving face on the end of each spindle to grip a workpiece,
(c) a plurality of spaced apart grinding wheels,
(d) a plurality of workpiece supports to engage workpieces magnetically gripped by the spindles for location of said workpieces for grinding by said grinding wheels,
(e) and means periodically to index said carrier.

References Cited by the Examiner
UNITED STATES PATENTS

| | | | |
|---|---|---|---|
| 731,230 | 6/1903 | Schrader | 51—105 |
| 1,926,974 | 9/1933 | Einstein | 51—117 |
| 1,999,321 | 4/1935 | Dunham | 51—103 X |
| 2,109,600 | 3/1938 | Vanderbeek | 51—215 X |
| 2,478,607 | 8/1949 | Theler et al. | 51—103 |
| 2,826,017 | 3/1958 | Snyder | 51—236 X |
| 2,864,622 | 12/1958 | Seidel | 279—1 |
| 2,874,518 | 2/1959 | Balsiger | 51—103 |

LESTER M. SWINGLE, *Primary Examiner.*